US012679953B2

(12) United States Patent
Welker et al.

(10) Patent No.: US 12,679,953 B2
(45) Date of Patent: Jul. 14, 2026

(54) REINFORCED FLUOROPOLYMER

(71) Applicant: OMYA INTERNATIONAL AG, Oftringen (CH)

(72) Inventors: Matthias Welker, Hésingue (FR); Samuel Rentsch, Spiegel bei Bern (CH)

(73) Assignee: OMYA INTERNATIONAL AG, Oftringen (CH)

( * ) Notice: Subject to any disclaimer, the term of this patent is extended or adjusted under 35 U.S.C. 154(b) by 805 days.

(21) Appl. No.: 17/927,942

(22) PCT Filed: Jul. 15, 2021

(86) PCT No.: PCT/EP2021/069693
§ 371 (c)(1),
(2) Date: Nov. 28, 2022

(87) PCT Pub. No.: WO2022/013332
PCT Pub. Date: Jan. 20, 2022

(65) Prior Publication Data
US 2023/0220185 A1 Jul. 13, 2023

(30) Foreign Application Priority Data

Jul. 16, 2020 (EP) .................................... 20186219

(51) Int. Cl.
C08K 9/04 (2006.01)
C08J 3/20 (2006.01)
(Continued)

(52) U.S. Cl.
CPC ................ C08K 9/04 (2013.01); C08J 3/203 (2013.01); C08J 3/247 (2013.01); C08J 3/28 (2013.01);
(Continued)

(58) Field of Classification Search
None
See application file for complete search history.

(56) References Cited

U.S. PATENT DOCUMENTS 7,135,518 B2 * 11/2006 Bandou ................ C08G 65/336
524/445
11,167,998 B2 * 11/2021 Yoshida ................ C01F 11/181
(Continued)

FOREIGN PATENT DOCUMENTS

CH 439709 A * 7/1967 .............. C08K 5/29
CN 2505672 Y * 8/2002
CN 101956876 B * 8/2013
CN 103756202 A * 4/2014
(Continued)

OTHER PUBLICATIONS

Oct. 29, 2021 Search Report issued in International Patent Application No. PCT/EP2021/069693.
Oct. 29, 2021 Written Opinion issued in International Application No. PCT/EP2021/069693.

*Primary Examiner* — Sanza L. McClendon
(74) *Attorney, Agent, or Firm* — Oliff PLC

(57) ABSTRACT

A curable fluoropolymer composition includes a crosslinkable fluorine-containing polymer, and a filler selected from surface-reacted calcium carbonate, ultrafine calcium carbonate, or a mixture thereof, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source. Furthermore, the disclosure relates to a cured fluoropolymer product formed from said composition, an article including the cured fluoropolymer product, a method of producing a cured fluoropolymer product, and use of said filler for reinforcing a cured fluoropolymer product.

17 Claims, 1 Drawing Sheet

Figure 1:
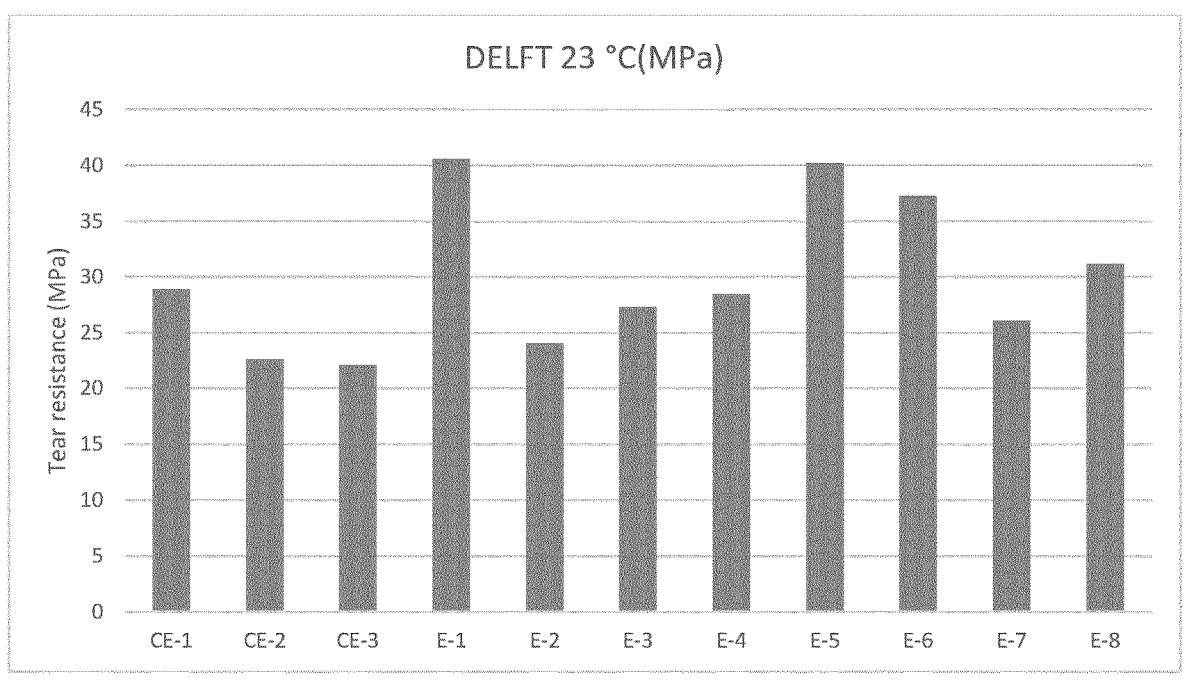

(51) Int. Cl.

| | |
|---|---|
| *C08J 3/24* | (2006.01) |
| *C08J 3/28* | (2006.01) |
| *C08K 9/02* | (2006.01) |
| *C09C 1/02* | (2006.01) |
| *C09C 3/00* | (2006.01) |
| *C09C 3/06* | (2006.01) |
| *C09C 3/10* | (2006.01) |

(52) U.S. Cl.
CPC ................ *C08K 9/02* (2013.01); *C09C 1/022* (2013.01); *C09C 3/006* (2013.01); *C09C 3/06* (2013.01); *C09C 3/10* (2013.01); *C01P 2004/61* (2013.01); *C01P 2004/62* (2013.01); *C01P 2006/12* (2013.01); *C08J 2327/16* (2013.01); *C08K 2201/005* (2013.01); *C08K 2201/006* (2013.01)

(56) References Cited

U.S. PATENT DOCUMENTS

2010/0036039 A1 * 2/2010 Sano ........................ C08K 9/02
524/451
2018/0148527 A1 5/2018 Yagi et al.

FOREIGN PATENT DOCUMENTS

| | | | | | | |
|---|---|---|---|---|---|---|
| CN | 103756202 | B | * | 2/2016 | | |
| CN | 106221078 | A | * | 12/2016 | ............. | C08L 27/12 |
| CN | 107690455 | A | | 2/2018 | | |
| CN | 108473789 | A | | 8/2018 | | |
| JP | H10-334736 | A | | 12/1998 | | |
| JP | 2008144061 | A | * | 6/2008 | | |
| JP | 7689543 | B2 | * | 6/2025 | .......... | C01B 32/198 |
| WO | 2016/198267 | A1 | | 12/2016 | | |
| WO | 2017/121661 | A1 | | 7/2017 | | |
| WO | WO-2018230336 | A1 | * | 12/2018 | ............. | C08L 27/16 |

* cited by examiner

REINFORCED FLUOROPOLYMER

The present invention relates to fluoropolymers, and in particular to a curable fluoropolymer composition, a cured fluoropolymer product, a method for producing said product, and the use of a filler comprising surface-reacted calcium carbonate and/or ultrafine ground calcium for reinforcing a cured fluoropolymer product.

Fluoroelastomers were introduced commercially in the late 1950 and early 1960 and greatly extended the utility of elastomers. Seals and other components made from fluoroelastomers have contributed to reliability, safety, and environmental protection in many areas including the aeronautical, automotive, oil, and chemical industries. Fluoroelastomers are outstanding for their thermal, thermooxidative and chemical resistance as well as for their resistance to swelling by most solvents. The chemical resistance and high temperature stability is essentially a result of the high bonding energy of the carbon-fluorine bond and the bulkiness of the fluorine atoms shielding the polymer back bone and carbon-fluorine bond from attack. Fluoroelastomers are used in a number of applications such as o-rings, gaskets, seal components, or valves, in automobiles, shipping, aircraft, chemical plants, industrial equipment, robot components or aerospace systems.

Fillers may be added to the fluoroelastomers with the aim of reducing their costs, and as reinforcing agents to improve mechanical properties of the fluoroelastomers. Fillers commonly used to reinforce fluoroelastomers are carbon black, or barium sulfate. However, even fluoroelastomers containing these filler material may be still deficient with respect to tear resistance. They may break easily during processing, for example, when there is a notch already existing. This may be particularly the case when the fluoroelastomer is still hot, for example, during unmolding.

In view of the foregoing, there is an ongoing need for fluoroelastomers with excellent mechanical properties, and in particular for fluoroelastomers having an improved tear resistance.

Accordingly, it is an object of the present invention to provide a fluoroelastomer with excellent mechanical properties, and in particular, with an improved tear resistance and/or elongation at break. Furthermore, it is desirable to provide a fluoroelastomer with good processability.

It is also an object to provide a filler for fluoroelastomers, which not only improves the mechanical properties of fluoroelastomers, but is at least partially derivable from natural sources, is environmentally benign and inexpensive. It would be desirable to provide a filler that has a light colour. Furthermore, it would be desirable to provide a filler that has no adverse effect during the curing of the fluoroelastomer.

The foregoing and other objects are solved by the subject-matter as defined in the independent claims.

According to one aspect of the present invention, a curable fluoropolymer composition is provided comprising
    a crosslinkable fluorine-containing polymer, and
    a filler selected from surface-reacted calcium carbonate, ultrafine calcium carbonate, or a mixture thereof,
    wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

According to a further aspect of the present invention, a cured fluoropolymer product formed from the curable fluoropolymer composition according to the present invention is provided.

According to still a further aspect of the present invention an article comprising the cured fluoropolymer product according to the present invention is provided, wherein the article is preferably selected from the group comprising o-ring seals, shaft seals, gaskets, tubing, valve stem seals, fuel hose, tank seals, diaphragms, flexi liners for pumps, mechanical seals, pipe coupling, valve lines, military flare blinders, electrical connectors, fuel joints, roll covers, firewall seals, and clips for jet engines.

According to still a further aspect of the present invention, a method of producing a cured fluoropolymer product is provided, comprising the steps of
    i) providing a crosslinkable fluorine-containing polymer,
    ii) providing a filler selected from surface-reacted calcium carbonate, ultrafine calcium carbonate, or a mixture thereof, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source,
    iii) combining the crosslinkable fluorine-containing polymer of step i) and the filler of step ii) to form a curable fluoropolymer composition, and
    iv) curing the curable fluoropolymer composition of step iii).

According to still a further aspect of the present invention, use of a filler for reinforcing a cured fluoropolymer product is provided, wherein the filler comprises surface-reacted calcium carbonate, ultrafine calcium carbonate, or a mixture thereof, and wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

Advantageous embodiments of the present invention are defined in the corresponding subclaims.

According to one embodiment, the crosslinkable fluorine-containing polymer is a copolymer of vinylidene fluoride and at least one monomer selected from the group comprising hexafluoropropylene, tetrafluoroethylene, fluorinated vinyl ether, perfluoroalkylvinylether, chlorotrifluoro-ethylene, propylene, ethylene, bromine- or iodine-containing fluoroolefins, and mixtures thereof, preferably the crosslinkable fluorine-containing polymer is a crosslinkable fluoroelastomer, more preferably the crosslinkable fluoroelastomer is selected from the group comprising FKM fluoroelastomer, FFKM fluoroelastomer, FEPM fluoroelastomer, and mixtures thereof, as defined by ASTM D1418-17, even more preferably the crosslinkable fluoroelastomer is a FKM fluoroelastomer, as defined by ASTM D1418-17, and most preferably the crosslinkable fluoroelastomer is a copolymer of vinylidene fluoride, hexafluoropropylene, and tetrafluoroethylene. According to another embodiment the crosslinkable fluorine-containing polymer has a specific gravity from 0.5 to 5, preferably from 0.7 to 4, and more preferably from 1 to 3, measured according to ASTM D297, and/or the crosslinkable fluorine-containing polymer has a fluorine content from 53 to 71 wt.-%, based on the total weight of the crosslinkable fluorine-containing polymer, preferably from 64 to 71 wt.-%, and most preferably from 66 to 71 wt.-%.

According to one embodiment the filler is present in an amount from 1 to 80 wt.-%, preferably from 2 to 60 wt.-%, more preferably from 5 to 40 wt.-%, and most preferably from 10 to 30 wt.-%, based on the total weight of the curable fluoropolymer composition. According to another embodiment the surface-reacted calcium carbonate has a volume median particle size $d_{50}$ from 0.1 to 75 μm, preferably from 0.5 to 50 μm, more preferably from 1 to 40 μm, even more preferably from 1.2 to 30 μm, and most preferably from 1.5 to 15 μm, and/or a volume top cut particle size d98 from 0.2 to 150 μm, preferably from 1 to 100 μm, more preferably from 2 to 80 μm, even more preferably from 2.4 to 60 μm, and most preferably from 3 to 30 μm, and/or a specific surface area of from 15 $m^2$/g to 200 $m^2$/g, preferably from 20 $m^2$/g to 180 $m^2$/g, more preferably from 25 $m^2$/g to 140 $m^2$/g, even more preferably from 27 $m^2$/g to 120 $m^2$/g, and most preferably from 30 $m^2$/g to 100 $m^2$/g, measured using nitrogen and the BET method.

According to one embodiment the ultrafine calcium carbonate has a volume median particle size $d_{50}$ from 0.05 to 1 μm, preferably from 0.1 to 0.8 μm, more preferably from 0.2 to 0.7 μm, even more preferably from 0.3 to 0.6 μm, and most preferably from 0.3 to 0.5 μm, and/or a weight top cut particle size d98 from 0.2 to 10 μm, preferably from 0.4 to 9 μm, more preferably from 0.6 to 8 μm, even more preferably from 0.8 to 7 μm, and most preferably from 1 to 6 μm, and/or a specific surface area of from 1 $m^2$/g to 100 $m^2$/g, preferably from 2 $m^2$/g to 75 $m^2$/g, more preferably from 3 $m^2$/g to 50 $m^2$/g, even more preferably from 5 $m^2$/g to 25 $m^2$/g, and most preferably from 8 $m^2$/g to 20 $m^2$/g, measured using nitrogen and the BET method.

According to one embodiment the natural ground calcium carbonate is selected from the group consisting of marble, chalk, limestone, and mixtures thereof, or the precipitated calcium carbonate is selected from the group consisting of precipitated calcium carbonates having an aragonitic, vateritic or calcitic crystal form, and mixtures thereof. According to another embodiment the at least one $H_3O^+$ ion donor is selected from the group consisting of hydrochloric acid, sulphuric acid, sulphurous acid, phosphoric acid, citric acid, oxalic acid, an acidic salt, acetic acid, formic acid, and mixtures thereof, preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a cation selected from $Li^+$, $Na^+$ and/or $K^+$, $HPO_4^{2-}$, being at least partially neutralised by a cation selected from $Li^+$, $Na^+$, $K^+$, $Mg^{2+}$, and/or $Ca^{2+}$, and mixtures thereof, more preferably the at least one $H_3O^+$ ion donor is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

According to one embodiment the ultrafine calcium carbonate is selected from the group consisting of ultrafine ground calcium carbonate, ultrafine precipitated calcium carbonate, ultrafine dolomite, and mixtures thereof. According to another embodiment the filler comprises a surface-treatment layer on at least a part of the filler surface, wherein the surface-treatment layer is formed by contacting the filler with at least one surface-treatment agent in an amount from 0.07 to 9 $mg/m^2$ of the filler surface, preferably 0.1 to 8 $mg/m^2$, more preferably from 0.11 to 3 $mg/m^2$, and wherein the at least one surface treatment agent is selected from the group consisting of mono- or di-substituted succinic anhydride containing compounds, mono- or di-substituted succinic acid containing compounds, mono- or di-substituted succinic acid salts containing compounds, saturated or unsaturated fatty acids, salts of saturated or unsaturated fatty acids; unsaturated esters of phosphoric acid, salts of unsaturated phosphoric acid esters, functionalized poly- and/or perfluorinated alkyl compounds, abietic acid, salts of abietic acid, and mixtures thereof and reaction products thereof, and preferably the at least one surface treatment agent is selected from the group consisting of mono- or di-substituted succinic anhydride containing compounds, saturated or unsaturated fatty acids, functionalized poly- and/or perfluorinated alkyl compounds, mixtures thereof and reaction products thereof, and most preferably the at least one surface treatment agent is selected from the group consisting of maleinized polybutadienes, saturated fatty acids, poly(hexafluoropropylene oxide)s having a terminal carboxyl group located on the terminal fluoromethylene group thereof, mixtures thereof and reaction products thereof.

According to one embodiment the curable fluoropolymer composition comprises a crosslinking agent, preferably the crosslinking agent is selected from the group consisting of an amine, a diamine, a bisphenol, a peroxide, and mixtures thereof, and more preferably the crosslinking agent is a peroxide. According to another embodiment the polymer composition further comprises acid acceptor, accelerator, colouring pigment, dyes, wax, lubricant, oxidative- and/or UV-stabilizer, antioxidant, additional filler, processing aid, plasticizer, additional polymer, and mixtures thereof, preferably the additional filler is selected from the group comprising carbon black, silica, graphite, clay, talc, diatomaceous earth, barium sulfate, titanium dioxide, wollastonite, and mixtures thereof, and most preferably the additional filler is carbon black.

According to one embodiment the tear resistance and/or the elongation at break of the cured fluoropolymer product is increased compared to a cured fluoropolymer product containing an equivalent volume of carbon black N550 as filler, preferably the tear resistance and/or the elongation at break of the cured fluoropolymer product is increased by at least 5%, preferably by at least 10%, more preferably by at least 15%, and most preferably by at least 20%.

It should be understood that for the purpose of the present invention, the following terms have the following meaning:

The term "acid" as used herein refers to an acid in the meaning of the definition by Brønsted and Lowry (e.g., $H_2SO_4$, $HSO_4^-$), wherein the term "free acid" refers only to those acids being in the fully protonated form (e.g., $H_2SO_4$).

As used herein the term "polymer" generally includes homopolymers and co-polymers such as, for example, block, graft, random and alternating copolymers, as well as blends and modifications thereof. The polymer can be an amorphous polymer, a crystalline polymer, or a semi-crystalline polymer, i.e. a polymer comprising crystalline and amorphous fractions. The degree of crystallinity is specified in percent and can be determined by differential scanning calorimetry (DSC). An amorphous polymer may be characterized by its glass transition temperature and a crystalline polymer may be characterized by its melting point. A semi-crystalline polymer may be characterized by its glass transition temperature and/or its melting point.

The term "copolymer" as used herein refers to a polymer derived from more than one species of monomer. Copolymers that are obtained by copolymerization of two monomer species may also be termed bipolymers, those obtained from three monomers terpolymers, those obtained from four monomers quaterpolymers, etc. (cf. IUPAC Compendium of Chemical Terminology 2014, "copolymer"). Accordingly, the term "homopolymer" refers to a polymer derived from one species of monomer.

The term "glass transition temperature" in the meaning of the present invention refers to the temperature at which the glass transition occurs, which is a reversible transition in amorphous materials (or in amorphous regions within semi-crystalline materials) from a hard and relatively brittle state into a molten or rubber-like state. The glass-transition temperature is always lower than the melting point of the crystalline state of the material, if one exists. The term "melting point" in the meaning of the present invention refers to the temperature at which a solid changes state from solid to liquid at atmospheric pressure. At the melting point the solid and liquid phase exist in equilibrium. Glass-transition temperature and melting point are determined by ISO 11357 with a heating rate of 10° C./min.

For the purpose of the present application, "water-insoluble" materials are defined as materials which, when 100 g of said material is mixed with 100 g deionised water and filtered on a filter having a 0.2 μm pore size at 20° C. to recover the liquid filtrate, provide less than or equal to 1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 μm pore size at 20° C. to recover the liquid filtrate, provide more than 1 g of recovered solid material following evaporation at 95 to 100° C. of 100 g of said liquid filtrate at ambient pressure.

The term "surface-reacted" in the meaning of the present application shall be used to indicate that a material has been subjected to a process comprising partial dissolution of said material in aqueous environment followed by a crystallization process on and around the surface of said material, which may occur in the absence or presence of further crystallization additives.

The term "surface-treated filler" in the meaning of the present invention refers to a filler which has been contacted with a surface treatment agent such as to obtain a coating layer on at least a part of the surface of the filler.

The "particle size" of particulate materials other than surface-reacted calcium carbonate and ultrafine calcium carbonate herein is described by its weight-based distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$(wt) unless indicated otherwise. Particle sizes were determined by using a Sedigraph™ 5100 instrument or Sedigraph™ 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$.

The "particle size" of surface-reacted calcium carbonate and ultrafine calcium carbonate herein is described as volume-based particle size distribution. Volume-based median particle size $d_{50}$ was evaluated using a Malvern Mastersizer 2000 or 3000 Laser Diffraction System. The $d_{50}$ or d98 value, measured using a Malvern Mastersizer 2000 or 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

A "salt" in the meaning of the present invention is a chemical compound consisting of an assembly of cations and anions (cf. IUPAC, Compendium of Chemical Terminology, $2^{nd}$ Ed. (the "gold book"), 1997, "salt").

The "specific surface area" (expressed in $m^2$/g) of a material as used throughout the present document can be determined by the Brunauer Emmett Teller (BET) method with nitrogen as adsorbing gas and by use of a ASAP 2460 instrument from Micromeritics. The method is well known to the skilled person and defined in ISO 9277:2010. Samples are conditioned at 100° C. under vacuum for a period of 30 min prior to measurement. The total surface area (in $m^2$) of said material can be obtained by multiplication of the specific surface area (in $m^2$/g) and the mass (in g) of the material.

For the purpose of the present invention, the "solids content" of a liquid composition is a measure of the amount of material remaining after all the solvent or water has been evaporated. If necessary, the "solids content" of a suspension given in wt.-% in the meaning of the present invention can be determined using a Moisture Analyzer HR73 from Mettler-Toledo (T=120° C., automatic switch off 3, standard drying) with a sample size of 5 to 20 g.

Unless specified otherwise, the term "drying" refers to a process according to which at least a portion of water is removed from a material to be dried such that a constant weight of the obtained "dried" material at 200° C. is reached. Moreover, a "dried" or "dry" material may be defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

For the purpose of the present invention, the term "viscosity" or "Brookfield viscosity" refers to Brookfield viscosity. The Brookfield viscosity is for this purpose measured by a Brookfield DV-II+Pro viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

A "suspension" or "slurry" in the meaning of the present invention comprises undissolved solids and water, and optionally further additives, and usually contains large amounts of solids and, thus, is more viscous and can be of higher density than the liquid from which it is formed.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

The curable fluoropolymer composition of the present invention comprises a crosslinkable fluorine-containing polymer, and a filler selected from surface-reacted calcium carbonate, ultrafine calcium carbonate, or a mixture thereof. The surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

In the following, preferred embodiments of the inventive products will be set out in more detail. It is to be understood that these embodiments and details also apply to the inventive method for their production and their uses.

Crosslinkable Fluorine-Containing Polymer

The curable fluoropolymer composition of the present invention comprises a crosslinkable fluorine-containing polymer.

A "fluorine-containing polymer" in the meaning of the present invention is a polymer containing fluorine in its repeating units. The term "crosslinkable" indicates that the polymer contains at least one site or group, which is capable of forming a crosslink between two polymer chains during curing of the polymer. A "crosslink" in the meaning of the present invention is a small region in a polymer from which at least four chains emanate, and is formed by reactions involving sites or groups on an existing polymer or by interactions between existing polymers, wherein the small region may be an atom, a group of atoms, or a number of branch points connected by bonds, groups of atoms, or oligomeric chains (cf. IUPAC, Compendium of Chemical Terminology, $2^{nd}$ Ed. (the "gold book"), 1997, "crosslink"). Preferably, the crosslink may be a covalent structure e.g. a covalent bond or a short sequence of chemical bonds, which joins two polymer chains together. The formation of crosslinks within the crosslinkable fluorine-containing polymer results in a polymer network, and thus, in a polymer of higher molecular mass.

The fluorine-containing polymer suitable for the present invention may be a polyethylene comprising fluoro, perfluoroalkyl, and/or perfluoroalkoxy groups on the polymer chain. For example, the fluorine-containing polymer may be composed of monomers selected from the group comprising, without being limited to, vinylidene fluoride, hexafluoropropylene, tetrafluoroethylene, chlorotrifluoro-ethylene, fluorinated vinyl ether, and/or perfluoroalkylvinylether such as perfluoromethylvinylether, perfluoroethylvinylether, or perfluoropropylvinylether. These polymers can be homopolymers or copolymers. The fluorine-containing polymer may comprise further suitable monomers known to the skilled person. For example, the fluorine-containing polymer may comprise bromine- or iodine-containing fluoroolefins in order to provide cure sites within the polymer, i.e. as cure site monomer. However, the crosslinkable fluorine-containing polymer may comprise any other suitable cure site monomer known to the skilled person, e.g., phenoxy- or nitrile substituted olefins.

According to one embodiment the crosslinkable fluorine-containing polymer is a copolymer of vinylidene fluoride and at least one monomer selected from the group comprising, preferably consisting of, hexafluoropropylene, tetrafluoroethylene, fluorinated vinyl ether, perfluoroalkylvinylether, chlorotrifluorethylene, propylene, ethylene, bromine- or iodine-containing fluoroolefins, and mixtures thereof. Examples of bromine- or iodine-containing fluoroolefins are bromotrifluoroehtylene, 1-bromo-2,2-difluoroehtylene, 4-bromo-3,3,4,4,-tetrafluorobutene-1,3-bromoperfluorpropylene, 4-bromo-fluorobutylene, iodinetrifluoroethylene, 1-iodine-2,2-difluoroehtylene, 4-iodine-3,3,4,4,-tetrafluorobutene-1,3-iodine-perfluorpropylene, or 4-iodine-fluorobutylene.

According to a preferred embodiment, the crosslinkable fluorine-containing polymer contains at least one bromine atom and/or iodine atom. The at least one bromine atom and/or at least one iodine atom may function as crosslinking site and may be present either at a terminal portion or at a non-terminal portion of the fluorine-containing polymer chain, and preferably is present at the terminal portion of the fluorine-containing polymer chain.

According to one embodiment, the crosslinkable fluorine-containing polymer is a crosslinkable fluoroelastomer. A "fluoroelastomer" in the meaning of the present invention is a fluorine-containing polymer which has a low $T_g$ value, e.g. a $T_g$ value of less than 0° C., preferably less than –5° C., more preferably less than –10° C., and most preferably less than –15° C., and displays rubber-like elasticity (cf. IUPAC, Compendium of Chemical Terminology, $2^{nd}$ Ed. (the "gold book"), 1997, "elastomer").

Fluoroelastomers may be categorized according to ASTM D1418-17—"Standard Practice for Rubber and Rubber Latices—Nomenclature". ASTM D1418-17 specifies three classes of fluoroelastomers:

FKM fluoroelastomers: Fluoro rubber of the polymethylene type that utilizes vinylidene fluoride as a comonomer and has substituent fluoro, alkyl, perfluoroalkyl or perfluoroalkoxy groups on the polymer chain, with or without a cure site monomer (having a reactive pendant group).

FFKM fluoroelastomers: Perfluorinated rubbers of the polymethylene type having all fluoro, perfluoroalkyl, or perfluoroalkoxy substituent groups on the polymer chain; a small fraction of these groups may contain functionality to facilitate vulcanization.

FEPM fluoroelastomers: Fluoro rubber of the polymethylene type only containing one or more of the monomeric alkyl, perfluoroalkyl, and/or perfluoroalkoxy groups, with or without a cure site monomer (having a reactive pendant group).

On the basis of their chemical composition FKM fluoroelastomers can be divided into the following types (cf. Hertz, "Fluorine-Containing Elastomers Introduction", Seals Eastern, Inc., available online: https://www.sealseastern.com/PDF/FluoroAcsChapter.pdf, and D1418-17):

Type 1 FKM: Dipolymer of vinylidene fluoride (VDF) and hexafluoropropylene (HFP). Copolymers are the standard type of FKMs showing a good overall performance. Their fluorine content is approximately 66 weight percent.

Type 2 FKM: Terpolymer of VDF, HFP, and tetrafluoroethylene (TFE). Terpolymers have a higher fluorine content compared to copolymers (typically between 68 and 69 weight percent fluorine), which results in better chemical and heat resistance. Compression set and low temperature flexibility may be affected negatively.

Type 3 FKM: Terpolymer of VDF, TFE, and a fluorinated vinyl ether, e.g. perfluoromethylvinylether (PMVE). The addition of PMVE provides better low temperature flexibility compared to copolymers and terpolymers. Typically, the fluorine content of type 3 FKMs ranges from 62 to 68 weight percent.

Type 4 FKM: Terpolymer of propylene, TFE, and VDF. While base resistance is increased in type 4 FKMs, their swelling properties, especially in hydrocarbons, are worsened. Typically, they have a fluorine content of about 67 weight percent.

Type 5 FKM: Pentapolymer of VDF, HFP, TFE, fluorinated vinyl ether, and ethylene. Type 5 FKM is known for base resistance and high temperature hydrogen sulfide resistance.

Type 6 FKM: Copolymer of VDF and 2,3,3,3-tetrafluoropropene.

According to one embodiment the crosslinkable fluoroelastomer is selected from the group comprising, preferably consisting of, FKM fluoroelastomer, FFKM fluoroelastomer, FEPM fluoroelastomer, and mixtures thereof, as defined by ASTM D1418-17, preferably the crosslinkable fluoroelastomer is a FKM fluoroelastomer, as defined by ASTM D1418-17, more preferably the crosslinkable fluoroelastomer is a FKM fluoroelastomer of Type 2, as defined by ASTM D1418-17, and most preferably the crosslinkable fluoroelastomer is a copolymer of vinylidene fluoride, hexafluoropropylene, and tetrafluoroethylene. According to one embodiment the crosslinkable fluorine-containing polymer is a copolymer of vinylidene fluoride, hexafluoropropylene, tetrafluoroethylene, and a cure site monomer, preferably bromotrifluoroethylene, 1-bromo-2,2-difluoroehtylene, 4-bromo-3,3,4,4,-tetrafluorobutene-1,3-bromoperfluorpropylene, 4-bromo-fluorobutylene, iodinetrifluoroethylene, 1-iodine-2,2-difluoroehtylene, 4-iodine-3,3,4,4,-tetrafluorobutene-1,3-iodine-perfluorpropylene, and/or 4-iodine-fluorobutylene.

Methods for producing the crosslinkable fluorine-containing polymer are known in the art. For example, a radical polymerization method such as emulsion polymerization, solution polymerization, suspension polymerization or bulk polymerization may be used. Particularly preferred is emulsion polymerization using a water-soluble radical polymerization initiator. Emulsion polymerization is also suitable for production of a high molecular weight fluoroelastomer. In emulsion polymerization, a monomer mixture is polymerized in the presence of a radical polymerization initiator, an aqueous medium and an emulsifying agent and as a case requires, a chain transfer agent to prepare a fluoroelastomer.

Alternatively, crosslinkable fluorine-containing polymers are commercially available. Examples of commercially available fluoroelastomers are Viton®, Viton®Extreme™, and Kalrez® fluoroelastomers of DuPont Corporation, Dyneon™ fluoroelastomers of 3M Corporation, DAI-EL™ fluoroelastomers of Daikin Industries, Technoflon® of Solvay S.A., and Aflas® of Asahi Glass Co., Ltd. The skilled person will select the appropriate grade within these fluoroelastomer brands according to his needs and the envisaged use of the inventive curable fluoropolymer composition and/or the inventive cured fluoropolymer product.

According to one embodiment of the present invention the crosslinkable fluorine-containing polymer has a specific gravity from 0.5 to 5, preferably from 0.7 to 4, and more preferably from 1 to 3, measured according to ASTM D297.

The skilled person will adjust or select the fluorine content of the crosslinkable fluorine-containing polymer according to his needs and the envisaged use of the inventive curable fluoropolymer composition and/or the inventive cured fluoropolymer product. According to one embodiment the crosslinkable fluorine-containing polymer has a fluorine content from 53 to 71 wt.-%, based on the total weight of the crosslinkable fluorine-containing polymer, preferably from 64 to 71 wt.-%, and most preferably from 66 to 71 wt.-%.

According to one embodiment the curable fluoropolymer composition comprises the crosslinkable fluorine-containing polymer in an amount from 20 to 99 wt.-%, preferably in an amount from 40 to 98 wt.-%, more preferably from 60 to 95 wt.-%, and most preferably from 70 to 90 wt.-%, based on the total weight of the curable fluoropolymer composition.

The crosslinkable fluorine-containing polymer may be provided in solid form or molten form. According to one embodiment, the crosslinkable fluorine containing polymer is a solid polymer, for example, in form of granules, sheets, or a powder. According to another embodiment, the crosslinkable fluorine containing polymer is a molten polymer. According to a preferred embodiment, the crosslinkable fluorine-containing polymer is provided in solid form.

Filler

In addition to the crosslinkable fluorine-containing polymer, the curable fluoropolymer composition of the present invention comprises a filler selected from surface-reacted calcium carbonate, ultrafine calcium carbonate, or a mixture thereof, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source.

According to one embodiment the filler is present in an amount from 1 to 80 wt.-%, preferably from 2 to 60 wt.-%, more preferably from 5 to 40 wt.-%, and most preferably from 10 to 30 wt.-%, based on the total weight of the curable fluoropolymer composition. According to another embodiment the filler is present in an amount from 1 to 80 wt.-%, preferably from 2 to 60 wt.-%, more preferably from 5 to 40 wt.-%, and most preferably from 10 to 30 wt.-%, based on the total weight of the crosslinkable fluorine-containing polymer and the filler.

The filler may be provided in any suitable dry form. For example, the filler may be in form of a powder and/or in pressed or granulated form. The moisture content of the filler may be between 0.01 and 5 wt.-%, based on the total weight of the surface-reacted calcium carbonate. According to one embodiment, the moisture content of the filler is less than or equal to 1.0 wt.-%, based on the total weight of the filler, preferably less than or equal to 0.5 wt.-%, and more preferably less than or equal to 0.2 wt.-%. According to another embodiment, the moisture content of the filler is between 0.01 and 0.15 wt.-%, preferably between 0.02 and 0.10 wt.-%, and more preferably between 0.03 and 0.07 wt.-%, based on the total weight of the filler.

"Natural ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier. According to one embodiment natural ground calcium carbonate (GCC) is selected from calcium carbonate containing minerals selected from the group comprising marble, chalk, limestone and mixtures thereof. Natural calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous, semi-dry or humid environment or by precipitation of calcium and carbonate ions, for example $CaCl_2$) and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried. PCCs are described, for example, in EP 2 447 213 A1, EP 2 524 898

A1, EP 2 371 766 A1, EP 1 712 597 A1, EP 1 712 523 A1, or WO 2013/142473 A1. According to one embodiment of the present invention, the precipitated calcium carbonate is precipitated calcium carbonate, preferably comprising aragonitic, vateritic or calcitic mineralogical crystal forms or mixtures thereof.

According to one embodiment the natural ground calcium carbonate is selected from the group consisting of marble, chalk, limestone, and mixtures thereof, or the precipitated calcium carbonate is selected from the group consisting of precipitated calcium carbonates having an aragonitic, vateritic or calcitic crystal form, and mixtures thereof.

Surface-Reacted Calcium Carbonate

According to one embodiment, the filler comprises a surface-reacted calcium carbonate. The surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

An $H_3O^+$ ion donor in the context of the present invention is a Brønsted acid and/or an acid salt.

In a preferred embodiment of the invention the surface-reacted calcium carbonate is obtained by a process comprising the steps of: (a) providing a suspension of natural or precipitated calcium carbonate, (b) adding at least one acid having a $pK_a$ value of 0 or less at 20° C. or having a $pK_a$ value from 0 to 2.5 at 20° C. to the suspension of step (a), and (c) treating the suspension of step (a) with carbon dioxide before, during or after step (b). According to another embodiment the surface-reacted calcium carbonate is obtained by a process comprising the steps of: (A) providing a natural or precipitated calcium carbonate, (B) providing at least one water-soluble acid, (C) providing gaseous $CO_2$, (D) contacting said natural or precipitated calcium carbonate of step (A) with the at least one acid of step (B) and with the $CO_2$ of step (C), characterised in that: (i) the at least one acid of step B) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

Precipitated calcium carbonate may be ground prior to the treatment with carbon dioxide and at least one $H_3O^+$ ion donor by the same means as used for grinding natural calcium carbonate as described above.

According to one embodiment of the present invention, the natural or precipitated calcium carbonate is in form of particles having a weight median particle size $d_{50}$ of 0.05 to 10.0 μm, preferably 0.1 to 5.0 μm, more preferably 0.2 to 3.0 μm, even more preferably 0.3 to 1.2 μm, and most preferably 0.3 to 0.4 μm. According to a further embodiment of the present invention, the natural or precipitated calcium carbonate is in form of particles having a top cut particle size d98 of 0.15 to 55 μm, preferably 1 to 40 μm, more preferably 2 to 25 μm, most preferably 3 to 15 μm, especially 3 μm.

The natural and/or precipitated calcium carbonate may be used dry or suspended in water. Preferably, a corresponding slurry has a content of natural or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more $H_3O^+$ ion donor used for the preparation of surface reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acidic salt, generating $H_3O^+$ ions under the preparation conditions.

According to one embodiment, the at least one $H_3O^+$ ion donor is a strong acid having a $pK_a$ of 0 or less at 20° C.

According to another embodiment, the at least one $H_3O^+$ ion donor is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acidic salt, for example, $HSO_4^-$ or $H_2PO_4^-$, being at least partially neutralized by a corresponding cation such as $Li^+$, $Na^+$ or $K^+$, or $HPO_4^{2-}$, being at least partially neutralised by a corresponding cation such as $Li^+$, $Na^+$, $K^+$, $Mg^{2+}$ or $Ca^{2+}$. The at least one $H_3O^+$ ion donor can also be a mixture of one or more acids and one or more acidic salts.

According to still another embodiment, the at least one $H_3O^+$ ion donor is a weak acid having a $pK_a$ value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided. According to the preferred embodiment, the weak acid has a $pK_a$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, an acidic salt, acetic acid, formic acid, and mixtures thereof. Preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a corresponding cation such as $Li^+$, $Na^+$ or $K^+$, $HPO_4^{2-}$, being at least partially neutralised by a corresponding cation such as $Li^+$, $Na^+$, $K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the natural or precipitated calcium carbonate is suspended.

In a next step, the natural or precipitated calcium carbonate is treated with carbon dioxide. If a strong acid such as sulphuric acid or hydrochloric acid is used for the $H_3O^+$ ion donor treatment of the natural or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a $pK_a$ in the range of 0 to 2.5 at 20° C., wherein carbon dioxide is formed in situ, and thus, the carbon dioxide treatment will automatically be carried out simultaneously with the $H_3O^+$ ion donor treatment, followed by the additional treatment with carbon dioxide supplied from an external source.

In a preferred embodiment, the $H_3O^+$ ion donor treatment step and/or the carbon dioxide treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural or precipitated calcium carbonate, the natural or precipitated calcium carbonate is reacted with the one or more $H_3O^+$ ion donors and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the one or more $H_3O^+$ ion donors and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with the one or more $H_3O^+$ ion donors and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

In order to obtain a solid surface-reacted calcium carbonate in the form of granules or a powder, the aqueous suspension comprising the surface-reacted calcium carbonate is dried. Suitable drying methods are known to the skilled person.

In case the surface-reacted calcium carbonate has been dried, the moisture content of the dried surface-reacted calcium carbonate can be between 0.01 and 5 wt.-%, based on the total weight of the dried surface-reacted calcium carbonate. According to one embodiment, the moisture content of the dried surface-reacted calcium carbonate is less than or equal to 1.0 wt. %, based on the total weight of the dried surface-reacted calcium carbonate, preferably less than or equal to 0.5 wt. %, and more preferably less than or equal to 0.2 wt. %. According to another embodiment, the moisture content of the dried surface-reacted calcium carbonate is between 0.01 and 0.15 wt. %, preferably between 0.02 and 0.10 wt. %, and more preferably between 0.03 and 0.07 wt. %, based on the total weight of the dried surface-reacted calcium carbonate.

The surface-reacted calcium carbonate may have different particle shapes, such as e.g. the shape of roses, golf balls and/or brains.

In a preferred embodiment, the surface-reacted calcium carbonate has a specific surface area of from 15 m²/g to 200 m²/g, preferably from 20 m²/g to 180 m²/g, more preferably from 25 m²/g to 140 m²/g, even more preferably from 27 m²/g to 120 m²/g, most preferably from 30 m²/g to 100 m²/g, measured using nitrogen and the BET method. For example, the surface-reacted calcium carbonate has a specific surface area of from 75 m²/g to 100 m²/g, measured using nitrogen and the BET method. The BET specific surface area in the meaning of the present invention is defined as the surface area of the particles divided by the mass of the particles. As used therein the specific surface area is measured by adsorption using the BET isotherm (ISO 9277:2010) and is specified in m²/g.

It is furthermore preferred that the surface-reacted calcium carbonate particles have a volume median particle size $d_{50}$ (vol) of from 0.1 to 75 μm, preferably from 0.5 to 50 μm, more preferably 1 to 40 μm, even more preferably from 1.2 to 30 μm, and most preferably from 1.5 to 15 μm.

According to one embodiment the surface-reacted calcium carbonate particles have a volume top cut particle size $d_{98}$ from 0.2 to 150 μm, preferably from 1 to 100 μm, more preferably from 2 to 80 μm, even more preferably from 2.4 to 60 μm, and most preferably from 3 to 30 μm.

The value $d_x$ represents the diameter relative to which x % of the particles have diameters less than $d_x$. This means that the $d_{98}$ value is the particle size at which 98% of all particles are smaller. The $d_{98}$ value is also designated as "top cut". The $d_x$ values may be given in volume or weight percent. The $d_{50}$ (wt) value is thus the weight median particle size, i.e. 50 wt.-% of all grains are smaller than this particle size, and the $d_{50}$ (vol) value is the volume median particle size, i.e. 50 vol.-% of all grains are smaller than this particle size.

Volume median particle size $d_{50}$ was evaluated using a Malvern Mastersizer 2000 or 3000 Laser Diffraction System. The $d_{50}$ or $d_{98}$ value, measured using a Malvern Mastersizer 2000 or 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median particle size is determined by the sedimentation method, which is an analysis of sedimentation behaviour in a gravimetric field. The measurement is made with a Sedigraph™ 5100 or 5120, Micromeritics Instrument Corporation. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and sonicated.

The processes and instruments are known to the skilled person and are commonly used to determine particle size of fillers and pigments.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds. The sample material is sealed in a 5 cm³ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764.).

The total pore volume seen in the cumulative intrusion data can be separated into two regions with the intrusion data from 214 $\mu$m down to about 1-4 $\mu$m showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Preferably, the surface-reacted calcium carbonate has an intra-particle intruded specific pore volume in the range from 0.1 to 2.3 cm$^3$/g, more preferably from 0.2 to 2.0 cm$^3$/g, especially preferably from 0.4 to 1.8 cm$^3$/g and most preferably from 0.6 to 1.6 cm$^3$/g, calculated from mercury porosimetry measurement.

The intra-particle pore size of the surface-reacted calcium carbonate preferably is in a range of from 0.004 to 1.6 $\mu$m, more preferably in a range of from 0.005 to 1.3 $\mu$m, especially preferably from 0.006 to 1.15 $\mu$m and most preferably of 0.007 to 1.0 $\mu$m, e.g. 0.02 to 0.6 $\mu$m determined by mercury porosimetry measurement.

According to one embodiment of the present invention the filler comprises, preferably consists of, surface-reacted calcium carbonate, and the natural ground calcium carbonate is selected from the group consisting of marble, chalk, limestone, and mixtures thereof, or the precipitated calcium carbonate is selected from the group consisting of precipitated calcium carbonates having an aragonitic, vateritic or calcitic crystal form, and mixtures thereof.

According to a further embodiment the filler comprises, preferably consists of, surface-reacted calcium carbonate, and the at least one H$_3$O$^+$ ion donor is selected from the group consisting of hydrochloric acid, sulphuric acid, sulphurous acid, phosphoric acid, citric acid, oxalic acid, an acidic salt, acetic acid, formic acid, and mixtures thereof, preferably the at least one H$_3$O$^+$ ion donor is selected from the group consisting of hydrochloric acid, sulphuric acid, sulphurous acid, phosphoric acid, oxalic acid, H$_2$PO$_4^-$, being at least partially neutralised by a cation selected from Li$^+$, Na$^+$ and/or K$^+$, HPO$_4^{2-}$, being at least partially neutralised by a cation selected from Li$^+$, Na$^+$, K$^+$, Mg$^{2+}$, and/or Ca$^{2+}$, and mixtures thereof, more preferably the at least one H$_3$O$^+$ ion donor is selected from the group consisting of hydrochloric acid, sulphuric acid, sulphurous acid, phosphoric acid, oxalic acid, or mixtures thereof, and most preferably, the at least one H$_3$O$^+$ ion donor is phosphoric acid.

Ultrafine Calcium Carbonate

According to one embodiment of the present invention, the filler comprises ultrafine calcium carbonate.

For the purpose of the present invention, the term "ultrafine calcium carbonate" refers to particulate calcium carbonate having a volume median particle size d$_{50}$ of not more than 1 $\mu$m and a volume top cut particle size d$_{98}$ of not more than 10 $\mu$m.

According to one embodiment, the ultrafine calcium carbonate has a volume median particle size d$_{50}$ from 0.05 to 1 $\mu$m, preferably from 0.1 to 0.8 $\mu$m, more preferably from 0.2 to 0.7 $\mu$m, even more preferably from 0.3 to 0.6 $\mu$m, and most preferably from 0.3 to 0.5 $\mu$m. In addition or alternatively, the ultrafine calcium carbonate may have volume top cut particle size d$_{98}$ from 0.2 to 10 $\mu$m, preferably from 0.4 to 9 $\mu$m, more preferably from 0.6 to 8 $\mu$m, even more preferably from 0.8 to 7 $\mu$m, and most preferably from 1 to 6 $\mu$m.

According to one embodiment the ultrafine calcium carbonate has a specific surface area of from 1 m$^2$/g to 100 m$^2$/g, preferably from 2 m$^2$/g to 75 m$^2$/g, more preferably from 3 m$^2$/g to 50 m$^2$/g, even more preferably from 5 m$^2$/g to 25 m$^2$/g, and most preferably from 8 m$^2$/g to 20 m$^2$/g, measured using nitrogen and the BET method.

According to one embodiment the ultrafine calcium carbonate is preferably selected from the group consisting of ultrafine ground calcium carbonate, ultrafine precipitated calcium carbonate, ultrafine dolomite, and mixtures thereof, preferably the ultrafine calcium carbonate is selected from the group consisting of ultrafine ground calcium carbonate, ultrafine precipitated calcium carbonate, and mixtures thereof, and most preferably the ultrafine calcium carbonate is ultrafine ground calcium carbonate. "Dolomite" in the meaning of the present invention is a calcium carbonate containing mineral, namely a carbonic calcium-magnesium-mineral, having the chemical composition of CaMg(CO$_3$)$_2$ ("CaCO$_3$·MgCO$_3$"). A dolomite mineral may contain at least 30.0 wt.-% MgCO$_3$, based on the total weight of dolomite, preferably more than 35.0 wt.-%, and more preferably more than 40.0 wt.-% MgCO$_3$. The ultrafine ground calcium carbonate may be preferably selected from marble, limestone and/or chalk, and/or the ultrafine precipitated calcium carbonate may be preferably selected from vaterite, calcite and/or aragonite.

The ultrafine calcium carbonate particles may agglomerate to larger units (agglomerates) by adhesion. For the purpose of the present invention, the term "agglomerate" refers to an assembly of primary particles, i.e. the ultrafine calcium carbonate particles, whose total surface area does not differ appreciable from the sum of the specific surface areas of the primary particles. According to one embodiment, the ultrafine calcium carbonate, preferably the ultrafine precipitated calcium carbonate, is present in form of agglomerates having a weight median particle size from 0.4 to 6 $\mu$m.

According to one embodiment, the ultrafine calcium carbonate is ultrafine ground calcium carbonate having a volume median particle size d$_{50}$ from 0.05 to 1 $\mu$m, preferably from 0.1 to 0.8 $\mu$m, more preferably from 0.2 to 0.7 $\mu$m, even more preferably from 0.3 to 0.6 $\mu$m, and most preferably from 0.3 to 0.5 $\mu$m, and/or a volume top cut particle size d$_{98}$ from 0.2 to 10 $\mu$m, preferably from 0.4 to 9 $\mu$m, more preferably from 0.6 to 8 $\mu$m, even more preferably from 0.8 to 7 $\mu$m, and most preferably from 1 to 6 $\mu$m.

According to another embodiment the ultrafine calcium carbonate is a ultrafine precipitated calcium carbonate having a specific surface area of from 1 $m^2/g$ to 100 $m^2/g$, preferably from 2 $m^2/g$ to 75 $m^2/g$, more preferably from 3 $m^2/g$ to 50 $m^2/g$, even more preferably from 5 $m^2/g$ to 25 $m^2/g$, and most preferably from 8 $m^2/g$ to 20 $m^2/g$, measured using nitrogen and the BET method.

Surface Treatment of Filler

The filler may be surface-treated with a surface treatment agent or may be a blend of surface-treated filler and non-surface treated filler. The surface treatment may further improve the surface characteristics and especially may increase the hydrophobicity of the filler, which may further improve the compatibility of the filler with the crosslinkable fluorine-containing polymer.

A "surface-treatment agent" in the meaning of the present invention is any material, which is capable of reacting and/or forming an adduct with the surface of the filler material, thereby forming a surface-treatment layer on at least a part of the surface of the filler material. It should be understood that the present invention is not limited to any particular surface-treatment agents. The skilled person knows how to select suitable materials for use as surface-treatment agents. However, it is preferred that the surface-treatment agents are selected from unsaturated and/or saturated surface-treatment agents.

The surface treatment agent may be selected from the group consisting of mono- or di-substituted succinic anhydride containing compounds, mono- or di-substituted succinic acid containing compounds, mono- or di-substituted succinic acid salts containing compounds, saturated or unsaturated fatty acids, salts of saturated or unsaturated fatty acids, unsaturated esters of phosphoric acid, salts of unsaturated phosphoric acid esters; poly- and/or perfluorinated alkyl compounds, abietic acid, salts of abietic acid, and mixtures thereof and reaction products thereof, and preferably the surface treatment agent is selected from the group consisting of mono- or di-substituted succinic anhydride containing compounds, saturated or unsaturated fatty acids, poly- and/or perfluorinated alkyl compounds, mixtures thereof and reaction products thereof. According to a preferred embodiment, the at least one surface treatment agent is selected from the group consisting of maleinized polybutadienes, saturated fatty acids, poly(hexafluoropropylene oxide)s having a terminal carboxyl group located on the terminal fluoromethylene group thereof, mixtures thereof and reaction products thereof. For the purpose of the present invention, the term "reaction products" of the surface-treatment agent refers to products obtained by contacting the filler material with the at least one surface-treatment agent. Said reaction products are formed between at least a part of the applied surface-treatment agent and reactive molecule sites located at the surface of the filler material.

According to one embodiment of the present invention, the filler comprises a surface-treatment layer on at least a part of the filler surface, wherein the surface-treatment layer is formed by contacting the filler with at least one surface-treatment agent in an amount from 0.07 to 9 $mg/m^2$ of the filler surface, preferably 0.1 to 8 $mg/m^2$, more preferably from 0.11 to 3 $mg/m^2$, and wherein the at least one surface treatment agent is selected from the group consisting of mono- or di-substituted succinic anhydride containing compounds, mono- or di-substituted succinic acid containing compounds, mono- or di-substituted succinic acid salts containing compounds, saturated or unsaturated fatty acids, salts of saturated or unsaturated fatty acids, unsaturated esters of phosphoric acid, salts of unsaturated phosphoric acid esters, functionalized poly- and/or perfluorinated alkyl compounds, abietic acid, salts of abietic acid, and mixtures thereof and reaction products thereof, and preferably the at least one surface treatment agent is selected from the group consisting of mono- or di-substituted succinic anhydride containing compounds, saturated or unsaturated fatty acids, functionalized poly- and/or perfluorinated alkyl compounds, mixtures thereof and reaction products thereof, and most preferably the at least one surface treatment agent is selected from the group consisting of maleinized polybutadienes, saturated fatty acids, poly(hexafluoropropylene oxide)s having a terminal carboxyl group located on the terminal fluoromethylene group thereof, mixtures thereof and reaction products thereof.

The term "at least one" surface treatment agent in the meaning of the present invention means that the surface treatment agent comprises, preferably consists of, one or more surface treatment agent(s).

In one embodiment of the present invention, the at least one surface treatment agent comprises, preferably consists of, one surface treatment agent. Alternatively, the at least one surface treatment agent comprises, preferably consists of, two or more surface treatment agents. For example, the at least one surface treatment agent comprises, preferably consists of, two or three surface treatment agents.

Preferably, the at least one surface treatment agent comprises, more preferably consists of, one surface treatment agent.

The at least one surface treatment agent can be a mono- or di-substituted succinic anhydride containing compound and/or a mono- or di-substituted succinic acid containing compound and/or a mono- or di-substituted succinic acid salt containing compound.

The term "succinic anhydride containing compound" refers to a compound containing succinic anhydride. The term "succinic anhydride", also called dihydro-2,5-furandione, succinic acid anhydride or succinyl oxide, has the molecular formula $C_4H_4O_3$ and is the acid anhydride of succinic acid.

The term "mono-substituted" succinic anhydride containing compound in the meaning of the present invention refers to a succinic anhydride wherein a hydrogen atom is substituted by another substituent.

The term "di-substituted" succinic anhydride containing compound in the meaning of the present invention refers to a succinic anhydride wherein two hydrogen atoms are substituted by another substituent.

The term "succinic acid containing compound" refers to a compound containing succinic acid. The term "succinic acid" has the molecular formula $C_4H_6O_4$.

The term "mono-substituted" succinic acid in the meaning of the present invention refers to a succinic acid wherein a hydrogen atom is substituted by another substituent.

The term "di-substituted" succinic acid containing compound in the meaning of the present invention refers to a succinic acid wherein two hydrogen atoms are substituted by another substituent.

The term "succinic acid salt containing compound" refers to a compound containing succinic acid, wherein the active acid groups are partially or completely neutralized. The term "partially neutralized" succinic acid salt containing compound refers to a degree of neutralization of the active acid groups in the range from 40 and 95 mole-%, preferably from 50 to 95 mole-%, more preferably from 60 to 95% and most preferably from 70 to 95%. The term "completely neutralized" succinic acid salt containing compound refers to a degree of neutralization of the active acid groups of >95 mole-%, preferably of >99 mole-%, more preferably of >99.8 mole-% and most preferably of 100 mole-%. Preferably, the active acid groups are partially or completely neutralized.

The succinic acid salt containing compound is preferably a compound selected from the group consisting of sodium, potassium, calcium, magnesium, lithium, strontium, primary amine, secondary amine, tertiary amine and/or ammonium salts thereof, whereby the amine salts are linear or cyclic. It is appreciated that one or both acid groups can be in the salt form, preferably both acid groups are in the salt form.

The term "mono-substituted" succinic acid salt in the meaning of the present invention refers to a succinic acid salt wherein a hydrogen atom is substituted by another substituent.

The term "di-substituted" succinic acid containing compound in the meaning of the present invention refers to a succinic acid salt wherein two hydrogen atoms are substituted by another substituent.

Accordingly, the mono- or di-substituted succinic anhydride containing compounds, mono- or di-substituted succinic acid containing compounds or mono- or di-substituted succinic acid salts containing compounds comprise substituent(s) $R^1$ and/or $R^2$.

It is appreciated that surface treatment agent located on the surface of the surface-treated calcium carbonate are suitable for undergoing a reaction with a material surrounding the surface-treated calcium carbonate. Thus, it is preferred that the mono- or di-substituted succinic anhydride containing compounds, mono- or di-substituted succinic acid containing compounds or mono- or di-substituted succinic acid salts containing compounds comprise substituent(s) $R^1$ and/or $R^2$ comprising a crosslinkable double bond.

The crosslinkable double bond is located terminally and/or in a side chain of substituent(s) $R^1$ and/or $R^2$.

The substituent(s) $R^1$ and/or $R^2$ comprising a crosslinkable double bond is/are preferably selected from an isobutylene, a polyisobutylene, an acryloyl, a methacryloyl group or mixtures thereof.

For example, the surface treatment agent is a polyisobutylene succinic anhydride having a Brookfield viscosity at 25° C. in the range from 1 000 to 300 000 mPa s. Additionally or alternatively, the surface treatment agent is a polyisobutylene succinic anhydride having an acid number in the range from 10 to 80 mg potassium hydroxide per g polyisobutylene succinic anhydride.

Preferably, the surface treatment agent is a polyisobutylene succinic anhydride having a Brookfield viscosity at 25° C. in the range from 1 000 to 300 000 mPa s and an acid number in the range from 10 to 80 mg potassium hydroxide per g polyisobutylene succinic anhydride.

In one embodiment, the surface treatment agent is a maleinized polybutadiene having a Brookfield viscosity at 25° C. in the range from 1 000 to 300 000 mPa s, and/or an acid number in the range from 10 to 300 mg potassium hydroxide per g maleinized polybutadiene and/or an iodine number in the range from 100 to 1 000 g iodine per 100 g maleinized polybutadiene. For example, the surface treatment agent is a maleinized polybutadiene having a Brookfield viscosity at 25° C. in the range from 1 000 to 300 000 mPa s, or an acid number in the range from 10 to 300 mg potassium hydroxide per g maleinized polybutadiene or an iodine number in the range from 100 to 1 000 g iodine per 100 g maleinized polybutadiene. Alternatively, the surface treatment agent is a maleinized polybutadiene having a Brookfield viscosity at 25° C. in the range from 1 000 to 300 000 mPa s, and an acid number in the range from 10 to 300 mg potassium hydroxide per g maleinized polybutadiene and an iodine number in the range from 100 to 1 000 g iodine per 100 g maleinized polybutadiene.

The term "maleinized" means that the succinic anhydride is obtained after reaction of substituent(s) $R^1$ and/or $R^2$ comprising a crosslinkable double bond with the double bond of maleic anhydride.

It is preferred that the mono- or di-substituted succinic anhydride containing compounds, mono- or di-substituted succinic acid containing compounds or mono- or di-substituted succinic acid salts containing compounds comprises substituent $R^1$ only. Accordingly, said compound is preferably a mono-substituted succinic anhydride containing compound, mono-substituted succinic acid containing compound or mono-substituted succinic acid salt containing compound comprising substituent $R^1$.

According to a preferred embodiment the mono- or di-substituted succinic anhydride containing compound is a maleinized polybutadiene.

Additionally or alternatively, the at least one surface treatment agent is selected from saturated fatty acids and/or salts of saturated fatty acids. The term "saturated fatty acid" in the meaning of the present invention refers to straight chain or branched chain, saturated organic compounds composed of carbon and hydrogen. Said organic compound further contains a carboxyl group placed at the end of the carbon skeleton.

In one embodiment, the saturated fatty acid is selected from saturated unbranched carboxylic acids, preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof, and preferably, the saturated fatty acid is selected from the group consisting of myristic acid, palmitic acid, stearic acid, and mixtures thereof.

Additionally or alternatively, the at least one surface treatment agent is selected from unsaturated fatty acids and/or salts of unsaturated fatty acids.

The term "unsaturated fatty acid" in the meaning of the present invention refers to straight chain or branched chain, unsaturated organic compounds composed of carbon and hydrogen. Said organic compound further contains a carboxyl group placed at the end of the carbon skeleton.

The unsaturated fatty acid is preferably selected from the group consisting of myristoleic acid, palmitoleic acid, sapienic acid, oleic acid, elaidic acid, vaccenic acid, linoleic acid, α-linolenic acid, eicosapentaenoic acid, docosahexaenoic acid and mixtures thereof. More preferably, the surface treatment agent being an unsaturated fatty acid is selected from the group consisting of myristoleic acid, palmitoleic acid, sapienic acid, oleic acid, elaidic acid, vaccenic acid, linoleic acid, α-linolenic acid and mixtures thereof. Most preferably, the surface treatment agent being an unsaturated fatty acid is oleic acid and/or linoleic acid, preferably oleic acid or linoleic acid, most preferably linoleic acid.

Additionally or alternatively, the surface treatment agent is a salt of a saturated or unsaturated fatty acid.

The term "salt of saturated or unsaturated fatty acid" refers to a saturated or unsaturated fatty acid, wherein the active acid group is partially or completely neutralized. The term "partially neutralized" saturated or unsaturated fatty acid refers to a degree of neutralization of the active acid groups in the range from 40 and 95 mole-% preferably from 50 to 95 mole-%, more preferably from 60 to 95 mole-% and most preferably from 70 to 95 mole-%. The term "completely neutralized" saturated or unsaturated fatty acid refers to a degree of neutralization of the active acid groups of >95 mole-%, preferably of >99 mole-%, more preferably of >99.8 mole-% and most preferably of 100 mole-%. Preferably, the active acid groups are partially or completely neutralized.

The salt of saturated or unsaturated fatty acid is preferably a compound selected from the group consisting of sodium, potassium, calcium, magnesium, lithium, strontium, primary amine, secondary amine, tertiary amine and/or ammonium salts thereof, whereby the amine salts are linear or cyclic. For example, the surface treatment agent is a salt of oleic acid and/or linoleic acid, preferably oleic acid or linoleic acid, most preferably linoleic acid.

Additionally or alternatively, the at least one surface treatment agent is an unsaturated ester of phosphoric acid and/or a salt of an unsaturated phosphoric acid ester.

Thus, the unsaturated ester of phosphoric acid may be a blend of one or more phosphoric acid mono-ester and one or more phosphoric acid di-ester and optionally one or more phosphoric acid tri-ester. In one embodiment, said blend further comprises phosphoric acid.

For example, the unsaturated ester of phosphoric acid is a blend of one or more phosphoric acid mono-ester and one or more phosphoric acid di-ester. Alternatively, the unsaturated ester of phosphoric acid is a blend of one or more phosphoric acid mono-ester and one or more phosphoric acid di-ester and phosphoric acid. Alternatively, the unsaturated ester of phosphoric acid is a blend of one or more phosphoric acid mono-ester and one or more phosphoric acid di-ester and one or more phosphoric acid tri-ester. Alternatively, the unsaturated ester of phosphoric acid is a blend of one or more phosphoric acid mono-ester and one or more phosphoric acid di-ester and one or more phosphoric acid tri-ester and phosphoric acid.

For example, said blend comprises phosphoric acid in an amount of ≤8 mol.-%, preferably of ≤6 mol.-%, and more preferably of ≤4 mol.-%, like from 0.1 to 4 mol.-%, based on the molar sum of the compounds in the blend.

The term "phosphoric acid mono-ester" in the meaning of the present invention refers to an o-phosphoric acid molecule mono-esterified with one alcohol molecule selected from unsaturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid di-ester" in the meaning of the present invention refers to an o-phosphoric acid molecule di-esterified with two alcohol molecules selected from the same or different, unsaturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid tri-ester" in the meaning of the present invention refers to an o-phosphoric acid molecule tri-esterified with three alcohol molecules selected from the same or different, unsaturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

Additionally or alternatively, the surface treatment agent is a salt of an unsaturated phosphoric acid ester. In one embodiment, the salt of an unsaturated phosphoric acid ester may further comprise minor amounts of a salt of phosphoric acid.

The term "salt of unsaturated phosphoric acid ester" refers to an unsaturated phosphoric acid ester, wherein the active acid group(s) is/are partially or completely neutralized. The term "partially neutralized" unsaturated phosphoric acid esters refers to a degree of neutralization of the active acid group(s) in the range from 40 and 95 mole-%, preferably from 50 to 95 mole-%, more preferably from 60 to 95 mole-% and most preferably from 70 to 95 mole-%. The term "completely neutralized" unsaturated phosphoric acid esters refers to a degree of neutralization of the active acid group(s) of >95 mole-%, preferably of >99 mole-%, more preferably of >99.8 mole-% and most preferably of 100 mole-%. Preferably, the active acid group(s) is/are partially or completely neutralized.

The salt of unsaturated phosphoric acid ester is preferably a compound selected from the group consisting of sodium, potassium, calcium, magnesium, lithium, strontium, primary amine, secondary amine, tertiary amine and/or ammonium salts thereof, whereby the amine salts are linear or cyclic.

Additionally or alternatively, the at least one surface treatment agent is a functionalized poly- and/or perfluorinated alkyl compound.

A "poly- and/or perfluorinated alkyl compound" in the meaning of the present invention is an alkyl compound containing fluorine, and preferably is poly- and/or perfluorinated, i.e. contains several or only carbon-fluorine bonds (no C—H bonds) and C—C bonds but also other heteroatoms.

It may also be a fluoropolymer, i.e. a polymer containing fluorine in its repeating units, and preferably is poly- and/or perfluorinated, i.e. contains several or only carbon-fluorine bonds (no C—H bonds) and C—C bonds but also other heteroatoms.

The at least one functionalized poly- and/or perfluorinated alkyl compound preferably has at least one functional group, preferably at least two functional groups, more preferably at least one functional terminal group, even more preferably at least two functional terminal groups, which may be the same or different. Accordingly, in a preferred embodiment the functionalized poly- and/or perfluorinated alkyl compound has one functional group, preferably a terminal functional group. In another preferred embodiment, the functionalized poly- and/or perfluorinated alkyl compound has two functional groups, preferably two terminal functional groups. It is also possible that the functionalized poly- and/or perfluorinated alkyl compound has non-terminal functional groups or terminal and non-terminal functional groups.

Generally, if the functionalized poly- and/or perfluorinated alkyl compound has more than one functional group, the groups may be the same or different. A functional group in the meaning of the present invention is in line with conventional definitions of a functional group, i.e. is a specific substituent within the poly- and/or perfluorinated alkyl compound that is responsible for the characteristic chemical reactions of this poly- and/or perfluorinated alkyl compound. The same functional group will undergo the same or similar chemical reaction regardless of the size of the molecule it is a part of. Functional groups are groups of one or more atoms of distinctive chemical properties no matter what they are attached to. For repeating units of polymers, functional groups attach to their nonpolar core of carbon atoms and thus add chemical character to carbon chains. Functional groups can also be charged, e.g. in carboxylate salts (—COO—), which turns the molecule into a polyatomic ion or a complex ion.

The poly- and/or perfluorinated alkyl compound having at least one functional group is in an especially preferred embodiment a functionalized fluoropolymer, i.e. a polymer containing fluorine in its repeating units, which is poly- and/or perfluorinated and has at least one functional group.

Preferably, the at least one functionalized poly- and/or perfluorinated alkyl compound comprises a linear poly- and/or perfluorinated alkyl compound having at least one functional group. In an especially preferred embodiment, the at least one functionalized poly- and/or perfluorinated alkyl compound is a poly- and/or perfluorinated alkyl compound having one functional group, more preferably one terminal functional group. It may also be advantageous, that the at least one functionalized poly- and/or perfluorinated alkyl compound is a poly- and/or perfluorinated alkyl compound having two functional groups, preferably two terminal functional groups.

The functionalized poly- and/or perfluorinated alkyl compound preferably is selected from the group comprising poly- and/or perfluorinated alkyl compounds having at least one functional group, which is selected from the group comprising hydroxyl; carboxyl; alkoxy, preferably methoxy and ethoxy; alkoxycarbonyl, preferably methoxycarbonyl and ethoxycarbonyl; methylene alcohol, allyl ether, amino; ammonio; carboxamido; sulfanyl; sulfonyl; sulfo; alkoxysulfonyl; salts, derivatives and mixtures thereof. In a preferred embodiment, the at least one functionalized poly- and/or perfluorinated alkyl compound is selected from the group comprising functionalized poly- and/or perfluoropolyethers, poly- and/or perfluorocarboxylic acids, poly- and/or perfluorosulfonic acids, their salts, derivatives and mixtures thereof.

According to one embodiment, the at least one functionalized poly- and/or perfluorinated alkyl compound is selected from the group comprising functionalized poly- and/or perfluoropolyethers having at least one functional group, preferably at least one terminal functional group, more preferably at least one terminal functional group selected from the group comprising a carboxyl group, a phosphate ester group, a hydroxy group, their salts, derivatives and mixtures thereof, and is most preferably selected from the group comprising poly(hexafluoropropylene oxide)s having a terminal carboxyl group located on the terminal fluoromethylene group thereof, or a bifunctional perfluoropolyether ammonium phosphate salt.

Also suitable for the use in the present invention may be functionalized poly- and/or perfluorinated alkyl compounds selected from the group comprising poly- and/or perfluorocarboxylic acids, preferably perfluoroheptanoic acid (PFHpA), perfluorooctanoic acid (PFOA), perfluorononanoic acid (PFNA), perfluorodecanoic acid (PFDA), perfluorododecanoic acid, perfluorooctane sulfonate (PFOS), perfluorooctane sulfonamide (PFOSA), perfluorobutane sulfonic acid (PFBS), perfluorohexane sulfonic acid (PFHxS), heptafluorobutyric acid (HFBA), their salts, derivatives and mixtures thereof.

In another embodiment, the at least one functionalized poly- and/or perfluorinated alkyl compound may be selected from the group comprising poly- and/or perfluorosulfonic acids, preferably perfluorobutanesulfonic acid (PFBS), perfluorobutane sulfonamide (FBSA), perfluorooctanesulfonamide (PFOSA), perfluorooctanesulfonic acid (PFOS), their salts, derivatives and mixtures thereof.

One especially preferred group of functionalized poly- and/or perfluorinated alkyl compounds is the group of colourless synthetic lubricants (oils and greases) marketed under the trademark Krytox™ by The Chemours Company/DuPont. Krytox™ oils are fluorocarbon ether polymers of polyhexafluoropropylene oxide, with a chemical formula: F—(CF(CF$_3$)—CF$_2$—O)$_n$—CF$_2$CF$_3$, wherein n=10-60, which may be functionalized by a terminal functional group. Suitable for the use in the present invention are functionalized Krytox™ compounds such as Krytox™ 157 FS(L) and Krytox™ 157 FS(H), which are poly(hexafluoropropylene oxide) functionalized with a carboxylic group situated on the terminal fluoromethylene group having molecular weights of about 2500 and 7000-7500 g/mole, respectively. Also, fluoropolyether marketed under the tradename Fluorolink® by Solvay are useful in the present invention. These compounds are bifunctional fluoropolyethers having the formula X—CF$_2$O—(CF$_2$CF$_2$O)m-(CF$_2$O)n-OCF$_2$—X, wherein m and n=0.8-4, AMU=1000-4000, for example Fluorolink® P54, an aqueous emulsion of a fluoropolyether ammonium phosphate salt.

Additionally or alternatively, the at least one surface treatment agent is abietic acid (also named: abieta-7,13-dien-18-oic acid).

Additionally or alternatively, the at least one surface treatment agent is a salt of abietic acid.

The term "salt of abietic acid" refers to abietic acid, wherein the active acid groups are partially or completely neutralized. The term "partially neutralized" abietic acid refers to a degree of neutralization of the active acid groups in the range from 40 and 95 mole-%, mol %, preferably from 50 to 95 mole-%, more preferably from 60 to 95 mole-% and most preferably from 70 to 95 mole-%. The term "completely neutralized" abietic acid refers to a degree of neutralization of the active acid groups of >95 mole-%, preferably of >99 mole-%, more preferably of >99.8 mole-% and most preferably of 100 mole-%. Preferably, the active acid groups are partially or completely neutralized, more preferably completely neutralized.

The salt of abietic acid is preferably a compound selected from the group consisting of sodium, potassium, calcium, magnesium, lithium, strontium, primary amine, secondary amine, tertiary amine and/or ammonium salts thereof, whereby the amine salts are linear or cyclic.

According to one embodiment, the surface-treatment agent is selected from the group consisting of a) sodium, potassium, calcium, magnesium, lithium, strontium, primary amine, secondary amine, tertiary amine and/or ammonium salts, whereby the amine salts are linear or cyclic, of mono- or di-substituted succinic acids, whereby one or both acid groups can be in the salt form, preferably both acid groups are in the salt form; unsaturated fatty acids, preferably oleic acid and/or linoleic acid; unsaturated esters of phosphoric acid; abietic acid and/or mixtures thereof, preferred are completely neutralized surface treatment agents; and/or b) a maleic anhydride grafted polybutadiene homopolymer or a maleic anhydride grafted polybutadiene-styrene copolymer and/or an acid and/or salt thereof, preferably a maleic anhydride grafted polybutadiene homopolymer having i) a number average molecular weight M$_n$ measured by gel permeation chromatography from 1 000 to 20 000 g/mol, preferably from 1 400 to 15 000 g/mol, and more preferably from 2 000 to 10 000 g/mol measured according to EN ISO 16014-1:2019, and/or ii) a number of anhydride groups per chain in the range from 2 to 12, preferably from 2 to 9, and more preferably from 2 to 6, and/or iii) an anhydride equivalent weight in the range from 400 to 2 200, preferably from 500 to 2 000, and more preferably from 550 to 1 800, and/or iv) an acid number in the range from 10 to 300 meq KOH per g of maleic anhydride grafted polybutadiene homopolymer, preferably 20 to 200 meq KOH/g, more preferably 30 to 150 meq KOH/g, measured according to ASTM D974-14, and/or v) a molar amount of 1,2-vinyl groups in the range from 5 to 80 mol-%, preferably 10 to 60 mol-%, more preferably 15 to 40 mol-%, based on the total amount of unsaturated carbon moieties in the maleic anhydride grafted polybutadiene homopolymer, and/or an acid and/or salt thereof.

The term "maleic anhydride grafted" means that a succinic anhydride is obtained after reaction of substituent(s) $R^1$ and/or $R^2$ comprising a carbon-carbon double bond with the double bond of maleic anhydride. Thus, the terms "maleic anhydride grafted polybutadiene homopolymer" and "maleic anhydride grafted polybutadiene-styrene copolymer" refer to a polybutadiene homopolymer and a polybutadiene-styrene copolymer each bearing succinic anhydride moieties formed from the reaction of a carbon-carbon double bond with the double bond of maleic anhydride, respectively.

For example, the maleic anhydride grafted polybutadiene homopolymer may have a number average molecular weight $M_n$ measured by gel permeation chromatography from 1 000 to 20 000 g/mol, preferably from 1 400 to 15 000 g/mol, more preferably from 2 000 to 10 000 g/mol, an acid number in the range from 20 to 200 meq KOH per g of maleic anhydride grafted polybutadiene homopolymer, preferably 30 to 150 meq KOH/g, measured according to ASTM D974-14, and a molar amount of 1,2-vinyl groups in the range from 10 to 60 mol-%, preferably 15 to 40 mol-%. In another embodiment, the maleic anhydride grafted polybutadiene homopolymer may have a number average molecular weight $M_n$ measured by gel permeation chromatography from 2000 to 5000 g/mol, an acid number in the range from 30 to 100 meq KOH/g, measured according to ASTM D974-14, and a molar amount of 1,2-vinyl groups in the range from 15 to 40 mol-%.

The surface-treatment agent may comprise, preferably consist of a maleic anhydride grafted polybutadiene homopolymer or a maleic anhydride grafted polybutadiene-styrene copolymer, preferably a maleic anhydride grafted polybutadiene homopolymer. Thus, the surface-treatment layer of the filler may be formed by contacting the filler material with said surface-treatment composition in an amount from 0.07 to 9 mg/m² of the filler material surface, preferably 0.1 to 8 mg/m², more preferably 0.11 to 3 mg/m².

For example, the surface-treatment layer on at least a part of the surface of the filler may be formed by contacting the filler with the maleic anhydride grafted polybutadiene homopolymer, or the maleic anhydride grafted polybutadiene homopolymer having a number average molecular weight $M_n$ measured by gel permeation chromatography from 1 000 to 20 000 g/mol, preferably from 1 400 to 15 000 g/mol, more preferably from 2 000 to 10 000 g/mol, an acid number in the range from 20 to 200 meq KOH per g of maleic anhydride grafted polybutadiene homopolymer, preferably 30 to 150 meq KOH/g, measured according to ASTM D974-14, and/or a molar amount of 1,2-vinyl groups in the range from 10 to 60 mol-%, preferably 15 to 40 mol-%, in an amount from 0.07 to 9 mg/m² of the filler material surface, preferably 0.1 to 8 mg/m², more preferably 0.11 to 3 mg/m².

The wording "comprising unsaturated carbon moieties" should be understood in that the respective compound comprises at least one unsaturated carbon moiety, such as a carbon-carbon double bond. For example, the respective compound may comprise one unsaturated carbon moiety. However, the respective compound may also comprise more than one unsaturated carbon moiety.

For the purposes of the present invention, an "unsaturated carbon moiety" refers to a double or triple bond, for example a carbon-carbon double bond, a carbon-carbon triple bond or a carbon-heteroatom multiple bond. Preferably, the unsaturated carbon moiety is a carbon-carbon double bond. It is appreciated that the unsaturated carbon moiety should be chemically crosslinkable, i.e., does not form part of an aromatic system.

In another embodiment, the at least one surface-treatment agent is a saturated surface-treatment agent selected from the group consisting of I) a phosphoric acid ester blend of one or more phosphoric acid mono ester and/or salts thereof and/or one or more phosphoric acid di-ester and/or salts thereof, and/or II) at least one saturated aliphatic linear or branched carboxylic acid and/or salts thereof preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_2$ and/or a salt thereof, most preferably at least one aliphatic carboxylic acid having a total amount of carbon atoms from Cm to Cis and/or a salt thereof and/or III) at least one aliphatic aldehyde and/or salts thereof, and/or IV) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or V) at least one polydialkylsiloxane, and/or VI) mixtures of the materials according to I) to V).

In still another preferred embodiment, the at least one surface-treatment agent comprises an unsaturated surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid and mixtures thereof, and further comprises a saturated surface-treatment agent selected from the group consisting of I) a phosphoric acid ester blend of one or more phosphoric acid mono ester and/or salts thereof and/or one or more phosphoric acid di-ester and/or salts thereof, and/or II) at least one saturated aliphatic linear or branched carboxylic acid and/or salts thereof preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_2$ and/or a salt thereof, most preferably at least one aliphatic carboxylic acid having a total amount of carbon atoms from $C_{16}$ to $C_{18}$ and/or a salt thereof and/or III) at least one aliphatic aldehyde and/or salts thereof, and/or IV) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or V) at least one polydialkylsiloxane, and/or VI) mixtures of the materials according to I) to V).

According to one embodiment of the present invention the surface-treated filler has a hydrophobicity of below 2.3:1 volumetric ratio of water:ethanol measured at +23° C. (±2° C.) with the sedimentation method. For example, the surface-treated filler has a hydrophobicity of below 2.2:1, preferably of below 2.1:1 and most preferably of below 2.0:1 volumetric ratio of water:ethanol measured at +23° C. (±2° C.) with the sedimentation method. For example the surface-treated filler has a hydrophobicity of 1.9:1 volumetric ratio of water:ethanol measured at +23° C. (±2° C.) with the sedimentation method. Most preferably, the surface-treated filler has a hydrophobicity in the range of 1:1 to 1.9:1 volumetric ratio of water:ethanol measured at +23° C. (±2° C.) with the sedimentation method.

Methods for the surface treatment of filler are known to the skilled person, and are described, for example, in EP 3 192 837 A1, EP 2 770 017 A1, and WO 2016/023937. According to one embodiment, the surface-treated filler of the present invention is obtainable by a process comprising the following steps:

a) providing an aqueous suspension of at least one filler having solids content in the range from 5 to 80 wt.-%, based on the total weight of the aqueous suspension;

b) optionally adjusting the pH-value of the aqueous suspension of step a) to a range from 7.5 to 12;

c) adding at least one surface treatment agent to the aqueous suspension obtained in step b) in an amount ranging from 0.07 to 9 mg/m² of the filler surface, preferably 0.1 to 8 mg/m², more preferably from 0.11 to 3 mg/m² of the filler surface, wherein the at least one surface treatment agent is selected from the group consisting of mono- or di-substituted succinic anhydride containing compounds, mono- or di-substituted succinic acid containing compounds, mono- or di-substituted succinic acid salts containing compounds; saturated or unsaturated fatty acids, salts of saturated or unsaturated fatty acids; unsaturated esters of phosphoric acid, salts of unsaturated phosphoric acid esters; a functionalized poly- and/or perfluorinated alkyl compound; abietic acid, salts of abietic acid and mixtures thereof;

d) mixing the aqueous suspension obtained in step c) at a temperature in the range from 30 to 120° C.;

e) drying the aqueous suspension during or after step d) at a temperature in the range from 40 to 160° C. at ambient or reduced pressure until the moisture content of the obtained surface-treated filler is in the range from 0.001 to 20 wt.-%, based on the total weight of the surface-treated filler; and f) adding at least one base to the aqueous suspension of step c) to readjust the pH-value to the range from 7.5 to 12 during or after step d); and/or g) deagglomerating the surface-treated filler of step d) or e) after or during step e).

According to one preferred embodiment, the at least one surface-treatment agent is selected from the group consisting of a) sodium, potassium, calcium, magnesium, lithium, strontium, primary amine, secondary amine, tertiary amine and/or ammonium salts, whereby the amine salts are linear or cyclic, of mono- or di-substituted succinic acids, whereby one or both acid groups can be in the salt form, preferably both acid groups are in the salt form; unsaturated fatty acids, preferably oleic acid and/or linoleic acid; unsaturated esters of phosphoric acid; abietic acid and/or mixtures thereof, preferred are completely neutralized surface treatment agents; and/or b) a maleic anhydride grafted polybutadiene homopolymer or a maleic anhydride grafted polybutadiene-styrene copolymer and/or an acid and/or salt thereof, preferably a maleic anhydride grafted polybutadiene homopolymer having i) a number average molecular weight $M_n$ measured by gel permeation chromatography from 1 000 to 20 000 g/mol, preferably from 1 400 to 15 000 g/mol, and more preferably from 2 000 to 10 000 g/mol measured according to EN ISO 16014-1:2019, and/or ii) a number of anhydride groups per chain in the range from 2 to 12, preferably from 2 to 9, and more preferably from 2 to 6, and/or iii) an anhydride equivalent weight in the range from 400 to 2 200, preferably from 500 to 2 000, and more preferably from 550 to 1 800, and/or iv) an acid number in the range from 10 to 300 meq KOH per g of maleic anhydride grafted polybutadiene homopolymer, preferably 20 to 200 meq KOH/g, more preferably 30 to 150 meq KOH/g, measured according to ASTM D974-14, and/or v) a molar amount of 1,2-vinyl groups in the range from 5 to 80 mol-%, preferably 10 to 60 mol-%, more preferably 15 to 40 mol-%, based on the total amount of unsaturated carbon moieties in the maleic anhydride grafted polybutadiene homopolymer, and/or an acid and/or salt thereof, and/or c) a functionalized poly- and/or perfluorinated alkyl compound, and/or d) at least one saturated aliphatic linear or branched carboxylic acid and/or salts thereof preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_2$ and/or a salt thereof, most preferably at least one aliphatic carboxylic acid having a total amount of carbon atoms from $C_{16}$ to $C_{18}$ and/or a salt thereof.

In a preferred embodiment, the filler is surface-reacted calcium carbonate having a volume median particle size $d_{50}$ (vol) of from 0.1 to 75 µm, preferably from 0.5 to 50 µm, more preferably 1 to 40 mm, even more preferably from 1.2 to 30 µm, and most preferably from 1.5 to 15 µm, a volume top cut particle size $d_{98}$(vol) from 0.2 to 150 µm, preferably from 1 to 100 µm, more preferably from 2 to 80 µm, even more preferably from 2.4 to 60 µm, and most preferably from 3 to 30 µm, a BET specific surface area of from 15 to 200 g/m², preferably from 20 to 180 g/m², more preferably from 25 to 140 g/m², even more preferably from 27 to 120 g/m², and most preferably from 30 to 100 g/m², measured using nitrogen and the BET method, wherein the filler comprises a surface-treatment layer on at least a part of the filler surface, wherein the surface-treatment layer is formed by contacting the filler with at least one surface-treatment agent in an amount from 0.07 to 9 mg/m$^2$ of the filler surface, preferably 0.1 to 8 mg/m$^2$, more preferably 0.11 to 3 mg/m$^2$, wherein the at least one surface-treatment agent is selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, poly- and/or perfluorinated alkyl compounds, and mixtures thereof, preferably a maleic anhydride grafted polybutadiene homopolymer, a maleic anhydride grafted polybutadiene-styrene copolymer, poly- and/or perfluorpolyether, or mixtures thereof, and most preferably a maleic anhydride grafted polybutadiene homopolymer and/or poly(hexafluoropropylene oxide) having a terminal carboxyl group located on the terminal fluoromethylene group thereof.

In a further preferred embodiment, the filler is ultrafine calcium carbonate, preferably ultrafine ground calcium carbonate, having a volume median particle size $d_{50}$ (vol) of from 0.05 to 1 μm, preferably from 0.1 to 0.8 μm, more preferably 0.2 to 0.7 mm, even more preferably from 0.3 to 0.6 μm, and most preferably from 0.3 to 0.5 μm, a volume top cut particle size $d_{98}$ (vol) from 0.2 to 10 μm, preferably from 0.4 to 9 μm, more preferably from 0.6 to 8 μm, even more preferably from 0.8 to 7 μm, and most preferably from 1 to 6 μm, a BET specific surface area of from 1 to 100 g/m$^2$, preferably from 2 to 75 g/m$^2$, more preferably from 3 to 50 g/m$^2$, even more preferably from 5 to 25 g/m$^2$, and most preferably from 8 to 20 g/m$^2$, measured using nitrogen and the BET method, wherein the filler comprises a surface-treatment layer on at least a part of the filler surface, wherein the surface-treatment layer is formed by contacting the filler with at least one surface-treatment agent in an amount from 0.07 to 9 mg/m$^2$ of the filler surface, preferably 0.1 to 8 mg/m$^2$, more preferably 0.11 to 3 mg/m$^2$, wherein the at least one surface-treatment agent is selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, saturated fatty acids, salts of saturated fatty acids, poly- and/or perfluorinated alkyl compounds, and mixtures thereof, preferably a maleic anhydride grafted polybutadiene homopolymer, a maleic anhydride grafted polybutadiene-styrene copolymer, saturated fatty acids, poly- and/or perfluorinated alkyl compounds, or mixtures thereof, and most preferably a maleic anhydride grafted polybutadiene homopolymer, saturated fatty acids and/or poly(hexafluoropropylene oxide) having a terminal carboxyl group located on the terminal fluoromethylene group thereof.

According to another embodiment, the filler does not comprise a surface-treatment layer, i.e. an untreated filler is employed in the inventive curable fluoropolymer, the inventive cured fluoropolymer, the inventive article, the inventive method, or the inventive use, respectively.

Further Components

The curable fluoropolymer composition of the present invention may contain further components.

According to one embodiment the curable polymer composition comprises a crosslinking agent. Suitable crosslinking agents are known to the skilled person. There are three commonly used primary types of crosslinking agents for fluoroelastomers, namely, bisphenol-based crosslinking agents, amine or diamine-based crosslinking agents, and peroxide-based crosslinking agents. The afore-mentioned crosslinking agents may be used in combination with a co-agent. All three crosslinking agents ultimately require unsaturated bonds through which chemical linkage is achieved. Unsaturation (i.e. a carbon double bond) may be achieved by either polymer heat treatment, dehydrohalogenation of a vinylidene fluoridemonomer, if it is present, or halogen displacement, e.g. a bromine or iodine, if a cure site monomer has been polymerized in the elastomer.

According to one embodiment the crosslinking agent is selected from the group consisting of an amine, a diamine, a bisphenol, a peroxide, and mixtures thereof.

Examples of suitable amine crosslinking-agents are butylamine, dibutylamine, piperidine, trimethylamine, or diethylcyclohexylamine. Examples of suitable diamine crosslinking-agents are bis-cinnamylidene hexamethylene diamine, hexamethylene diamine carbamate, bis-peroxycarbamate such as hexamethylene-N,N'bis(tert-butyl peroxycarbamate or methylene bis-4-cyclohexyl-N,N'(tert-butylperoxycarbamate), piperazine, triethylene diamine, tetramethylethyldiamine, or diethylene triamine.

Examples of suitable bisphenol crosslinking-agents are 2,2-bis(4-hydroxyphenyl)hexafluoro-propane, substituted hydroquinone, 4,4'-disubstituted bisphenol, or hexafluoro-bisphenol A.

Examples of suitable peroxide crosslinking-agents are dibenzoyl peroxide, di-t-butyl peroxide, dicumyl peroxide, 1,1-bis(tert-butylperoxy)-3,3,5-trimethylcyclohexane, 2,5-bis-(t-butylperoxy)-2,5-dimethylhexane, 2,5-bis-(t-butylperoxy)-2,5-dimethylhexyne, or α,α'-bis(t-butylperoxy)diisopropyl-benzene, diisopropyl peroxydicarbonate, 1,1-bis(tert-hexylperoxy)-3,5,5-trimethylcyclohexane, 2,5-dimethylhexane-2,5-dihydroperoxide, di-tert-butyl peroxide, tert-butylcumyl peroxide, 2,5-dimethyl-2,5-bis(tert-butylperoxy)hexane, 2,5-dimethyl-2,5-bis(tert-butylperoxy)-3-hexine, dibenzoyl peroxide, tert-butyl peroxybenzoate, 2,5-dimethyl-2,5-bis(benzoylperoxy)hexane, tert-butyl peroxymaleate or tert-hexylperoxyisopropyl monocarbonate. Preferably the peroxide crosslinking-agents may be used in combination with a coagent. Examples of suitable coagents are 1,2,-polybutadien, ethylene glycol dimethacrylate, triallyl phosphate, triallyl isocyanurate, or triallylcyanurate.

According to one embodiment the crosslinking agent is a peroxide crosslinking agent, preferably selected from group consisting of dibenzoyl peroxide, di-t-butyl peroxide, dicumyl peroxide, 1,1-bis(tert-butylperoxy)-3,3,5-trimethyl-cyclohexane, 2,5-bis-(t-butylperoxy)-2,5-dimethylhexane, 2,5-bis-(t-butylperoxy)-2,5-dimethylhexyne, or α,α'-bis(t-butylperoxy)diisopropyl-benzene, diisopropyl peroxydicarbonate, 1,1-bis(tert-hexylperoxy)-3,5,5-trimethylcyclohexane, 2,5-dimethylhexane-2,5-dihydroperoxide, di-tert-butyl peroxide, tert-butylcumyl peroxide, 2,5-dimethyl-2,5-bis(tert-butylperoxy)hexane, 2,5-dimethyl-2,5-bis(tert-butylperoxy)-3-hexine, dibenzoyl peroxide, tert-butyl peroxybenzoate, 2,5-dimethyl-2,5-bis(benzoylperoxy) hexane, tert-butyl peroxymaleate or tert-hexylperoxyisopropyl monocarbonate, and mixtures thereof, and most preferably 2,5-dimethyl-2,5-bis(benzoylperoxy)hexane.

According to a preferred embodiment, the peroxide cross-linking agent is used in combination with a coagent, preferably selected from the group consisting of 1,2,-polybutadien, ethylene glycol dimethacrylate, triallyl phosphate, triallyl isocyanurate, triallylcyanurate, and mixtures thereof, and most preferably triallyl isocyanurate.

According to one embodiment, the curable fluoropolymer composition comprises the crosslinking agent in an amount from 0.1 to 20 wt.-%, based on the total weight of the curable fluoropolymer composition, preferably in an amount from 0.2 to 15 wt.-%, more preferably from 0.5 to 10 wt.-%, and most preferably in an amount from 1 to 5 wt.-%.

The curable fluoropolymer composition may further comprise an acid acceptor. For example, an acid acceptor may be preferably used in combination with an amine or diamine crosslinking agent. Examples of suitable acid acceptors are magnesium oxide, calcium oxide, zinc oxide, lead oxide, copper oxide, magnesium hydroxide, aluminium hydroxide, calcium hydroxide, or hydrotalcite. According to one embodiment, the curable fluoropolymer composition comprises the acid acceptor in an amount from 0.1 to 10 wt.-%, based on the total weight of the curable fluoropolymer composition, preferably in an amount from 0.2 to 8 wt.-%, and most preferably in an amount from 0.5 to 5 wt.-%.

The curable fluoropolymer composition may further comprise an accelerator. For example, an accelerator may be preferably used in combination with a bisphenol-crosslinking agent. Examples of suitable accelerators are bis(tri-arylphosphin)iminium salt or tetrabutylammonium hydrogen sulfate. According to one embodiment, the curable fluoropolymer composition comprises the accelerator in an amount from 0.1 to 10 wt.-%, based on the total weight of the curable fluoropolymer composition, preferably in an amount from 0.2 to 8 wt.-%, and most preferably in an amount from 0.5 to 5 wt.-%.

The curable fluoropolymer composition may also comprise colouring pigment, dyes, wax, lubricant, oxidative- and/or UV-stabilizer, antioxidant, additional filler, processing aid, plasticizer, additional polymer, and mixtures thereof. According to one embodiment, the curable fluoropolymer comprises an additional filler, preferably the additional filler is selected from the group comprising carbon black, silica, graphite, clay, talc, diatomaceous earth, barium sulfate, titanium dioxide, wollastonite, and mixtures thereof, preferably barium sulfate, carbon black, wollastonite, and mixtures thereof, and most preferably the additional filler is carbon black. The additional filler may be present in an amount from 0.1 to 30, preferably from 1 to 20, and most preferably in an amount of 2 to 15 wt.-%, based on the total weight of the crosslinkable fluorine-containing polymer.

According to one embodiment the polymer composition further comprises acid acceptor, accelerator, colouring pigment, dyes, wax, lubricant, oxidative- and/or UV-stabilizer, antioxidant, additional filler, processing aid, plasticizer, additional polymer, and mixtures thereof, preferably the additional filler is selected from the group comprising carbon black, silica, graphite, clay, talc, diatomaceous earth, barium sulfate, titanium dioxide, wollastonite, and mixtures thereof, and most preferably the additional filler is carbon black Preparation of Curable Fluoropolymer Composition According to one embodiment, a method of producing the curable fluoropolymer composition of the present invention comprises the steps of:
i) providing a crosslinkable fluorine-containing polymer,
ii) providing a filler selected from surface-reacted calcium carbonate, ultrafine calcium carbonate, or a mixture thereof, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
iii) combining the crosslinkable fluorine-containing polymer of step i) and the filler of step ii).

The components of the composition may be combined by any method known in the art. According to one embodiment, the components are mixed in a mixer, preferably an open mill cylinder mixer. According to another embodiment, the components are kneaded by a kneading machine such as an open roll, a Banbury mixer or a kneader.

The components may be combined in a state dissolved or dispersed in a solvent. Further, in a case where the crosslinkable fluorine-containing polymer is two or more types of fluorine-containing polymers, individually produced fluorine-containing polymers may be blended first to produce a polymer mixture, before the filler is added, or two or more types of fluorine-containing polymers may be blended simultaneously with the filler.

The skilled person will adapt the blending temperature such that a reaction between the components of the curable fluoropolymer composition is avoided. For example, in case a crosslinking agent is present, cooling during blending may be required in order to avoid a crosslinking reaction. According to one embodiment, the blending temperature is from 20 to 120° C., preferably from 40 to 60° C. The blending time is preferably from 5 to 60 minutes, more preferably from 10 to 30 minutes.

According to one embodiment the filler is provided in an amount from 1 to 80 wt.-%, preferably from 2 to 60 wt.-%, more preferably from 5 to 40 wt.-%, and most preferably from 10 to 30 wt.-%, based on the total weight of the curable fluoropolymer composition. According to another embodiment the filler is provided in an amount from 1 to 80 wt.-%, preferably from 2 to 60 wt.-%, more preferably from 5 to 40 wt.-%, and most preferably from 10 to 30 wt.-%, based on the total weight of the crosslinkable fluorine-containing polymer and the filler.

Cured Fluoropolymer Product

According to a further aspect of the present invention, a cured fluoropolymer product formed from the curable fluoropolymer composition according to the present invention is provided.

The cured fluoropolymer product of the present invention may be formed from the curable fluoropolymer composition by any suitable method known in the art. A method of producing a cured fluoropolymer product may comprise the steps of
I) providing a curable fluoropolymer composition, and
II) curing the curable fluoropolymer composition.

According to one embodiment, a method of producing a cured fluoropolymer product is provided, comprising the steps of
i) providing a crosslinkable fluorine-containing polymer,
ii) providing a filler selected from surface-reacted calcium carbonate, ultrafine calcium carbonate, or a mixture thereof,
wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, iii) combining the crosslinkable fluorine-containing polymer of step i) and the filler of step ii) to form a curable fluoropolymer composition, and iv) curing the curable fluoropolymer composition of step iii).

The curing of the curable fluoropolymer composition may be carried out by any method known in the art. According to one embodiment the curing step II) or iv) is carried out by adding a crosslinking agent, heat treatment, ultraviolet light radiation, electron-beam radiation and/or nuclear radiation. In addition, further components, such as those mentioned above, may be added during any one of method steps I) and/or II) or any one of method steps i), ii), iii), and/or vi).

The heat treatment may be carried out at temperatures from 95 to 230° C., preferably from 125 to 180° C., and most preferably from 150 to 170° C. The heating time may be from 1 minute to 15 hours, preferably from 5 minutes to 2 hours, and most preferably from 10 to 30 minutes.

According to a preferred embodiment, the curing step II) or iv) is carried out by adding a crosslinking agent and applying a heat treatment. The addition of the crosslinking agent and the heat treatment may be carried out at the same time or the heat treatment may be applied after the addition of the crosslinking agent.

The curable fluoropolymer composition may be shaped and cured at the same time, or may be shaped first, and cured subsequently. According to a further embodiment of the present invention, the method of producing a cured fluoropolymer product comprises a further step III) or v) of shaping the curable fluoropolymer composition during steps II) or iv).

Methods of shaping a curable fluoropolymer composition are known to the skilled person. For example, the shaping may be carried out by extrusion or molding such as injection molding, transfer molding or compression molding, preferably compression molding. During compression molding, pressure is applied to force the mixture into the defined shape of the mold, such that the mixture is in contact with all areas of the mold, and the mixture is crosslinked in the mold, such that the cured fluoropolymer product retains the desired shape. Preferably, compression molding is performed at a pressure of at least 100 bar, preferably of at least 150 bar, and more preferably of at least 200 bar.

According to a further aspect of the present invention, an article comprising the cured fluoropolymer product according to the present invention is provided. According to a preferred embodiment the article is selected from the group comprising, preferably consisting of, o-ring seals, shaft seals, gaskets, tubing, valve stem seals, fuel hose, tank seals, diaphragms, flexi liners for pumps, mechanical seals, pipe coupling, valve lines, military flare blinders, electrical connectors, fuel joints, roll covers, firewall seals, and clips for jet engines.

The inventors of the present application surprisingly found that a filler selected from surface-reacted calcium carbonate, ultrafine calcium carbonate, or a mixture thereof, can be used for reinforcing a cured fluoropolymer product. In other words, it was found the mechanical properties of cured fluoropolymer product comprising the afore-mentioned fillers are improved compared to cured fluoropolymer product comprising no fillers or fillers conventionally used in the art such as carbon black. In particular, it was found that the tear resistance and the elongation of break of a cured fluoropolymer product can be improved by the presence of the inventive filler.

According to a further aspect, use of a filler for reinforcing a cured fluoropolymer product is provided, wherein the filler is selected from surface-reacted calcium carbonate, ultrafine calcium carbonate, or a mixture thereof, and wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

According to one embodiment the tear resistance and/or the elongation at break of the cured fluoropolymer product is increased compared to a cured fluoropolymer product containing an equivalent volume of carbon black N550 as filler, preferably the tear resistance and/or the elongation at break of the fluoroelastomer is increased by at least 5%, preferably by at least 10%, more preferably by at least 15%, and most preferably by at least 20%.

The scope and interest of the invention will be better understood based on the following examples which are intended to illustrate certain embodiments of the present invention and are non-limitative.

EXAMPLES

1. Methods

Molecular Weight

The number-average molecular weight $M_n$ is measured by gel permeation chromatography, according to ISO 16014-1:2019 and ISO 16014-2/2019.

Acid Number

The acid number is measured according to ASTM D974-14.

Specific Surface Area (BET)

The specific surface area (in $m^2/g$) is determined using the BET method (using nitrogen as adsorbing gas), which is well known to the skilled man (ISO 9277:2010). The total surface area (in $m^2$) of the filler material is then obtained by multiplication of the specific surface area and the mass (in g) of the corresponding sample.

Iodine Number

The iodine number is measured according to DIN 53241/1.

Particle Size

Volume median particle size $d_{50}(vol)$ and volume top cut particle size $d_{98}(vol)$ are evaluated using a Malvern Mastersizer 3000 Laser Diffraction System. The $d_{50}$ or $d_{98}$ value, measured using a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median particle size $d_{50}(wt)$ and weight top cut particle size $d_{98}(wt)$ is determined by the sedimentation method, which is an analysis of sedimentation behaviour in a gravimetric field. The measurement is made with a Sedigraph™ 5100 or 5120, Micromeritics Instrument Corporation. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and sonicated.

The processes and instruments are known to the skilled person and are commonly used to determine the particle size of fillers and pigments.

Analysis on Cured Fluoropolymer Product Samples

For all tests on the cured fluoropolymer product samples, a minimum period of 16 h was kept between molding and testing of the rubber samples. The samples were kept in a controlled environment (temperature: 23±2° C., relative humidity: 50±5%).

Tensile Strength and Elongation at Break:

Tensile strength was measured according to NF ISO 37 on a Zwick Z100 or Zwick Z005 device using the parameters outlined in Table 1 below.

TABLE 1

| Tensile strength measurement parameters. | |
| --- | --- |
| Standard | NF ISO 37 |
| Type of test piece | Type H2 |
| Preparation of test piece: | Samples were cut from sheets of 2 ± 0.2 mm thickness |
| Cutting direction | Parallel of calendering direction |
| State | Initial |
| Temperature | 23 ± 2° C. |
| Relative humidity | 50 ± 5% |
| Number of test pieces used | 3 |
| Units | MPa for strength % for elongation |
| Test specimen conditioning before test | Minimum 16 h at 23° C. and 50% relative humidity |
| Conditioning after ageing in air | None |
| Conditioning after immersion | None |
| Rate of grip separation | 500 mm/min |

Tear Resistance

Tear resistance (DELFT) was measured according to NF ISO 34-2 on a Zwick Z100 or Zwick Z005 device using the parameters outlined in Table 2.

TABLE 2

| Tear resistance (DELFT) measurement parameters. | |
| --- | --- |
| Standard | NF ISO 34-2 |
| Type of test piece | Delft |
| Preparation of test piece | Samples were cut from sheets of 2 ± 0.2 mm thickness |
| Cutting direction | perpendicular to calendering direction |
| State | Initial |
| Temperature | 23 ± 2° C. |
| Relative humidity | 50 ± 5% |
| Number of test pieces used | 3 |
| Test specimen conditioning before test | Minimum 16 h at 23° C. and 50% relative humidity |
| Rate of grip separation | 500 mm/min |

2. Materials

Treatment A

Treatment A is a low molecular weight maleinized polybutadiene ($M_n$: 3100 Da, Brookfield viscosity: 6500 cps+/−3500 at 25° C., acid number: 40.1-51.5 meq KOH/g, total acid amount: 7-9 wt.-%, based on total weight of treatment composition; microstructure (molar % of butadiene): 20-35% 1,2-vinyl functional groups.

Treatment B

Treatment B is a poly(hexafluoropropylene oxide) functionalized with a carboxylic group situated on the terminal fluoromethylene group (molecular weight: ca. 2500 Da, viscosity (cSt, 40° C.): 99.4-149, TAN-E (mg KOH/g): 23-27, density (g/mL, −9° C.): 1.91). It is commercially available from Chemours Company under tradename Krytox 157FS(L).

Treatment C

Treatment C is a fatty acid mixture, which consists of a 1:1 mixture of stearic acid and palmitic acid.

Powder 1

Powder 1 is a modified calcium carbonate composed of 80 wt.-% hydroxyapatite and 20 wt.-% calcite (BET=85 $m^2/g$, $d_{50}(vol)=6.1$ μm, $d_{98}(vol)=13.8$ μm), prepared by the following method:

In a mixing vessel, 350 liters of an aqueous suspension of natural ground calcium carbonate was prepared by adjusting the solids content of a ground marble calcium carbonate from Hustadmarmor, Norway, with a particle size distribution of 90 wt.-% less than 2 μm, as determined by sedimentation, such that a solids content of 10 wt.-%, based on the total weight of the aqueous suspension, was obtained. Whilst mixing the suspension, 62 kg of a 30% concentrated phosphoric acid was added to said suspension over a period of 10 minutes at a temperature of 70° C. Finally, after the addition of the phosphoric acid, the slurry was stirred for additional 5 minutes, before removing it from the vessel and drying it.

Powder 2

Powder 2 was obtained by preparing 350 litres of an aqueous suspension of ground calcium carbonate in a mixing vessel by adjusting the solids content of a ground marble calcium carbonate from Omya Spa, Carrara, Italy, having a mass based median particle size of 1.7 μm, as determined by sedimentation, such that a solids content of 15 wt.-%, based on the total weight of the aqueous suspension, was obtained. Whilst mixing the slurry, 33 kg of a 30% concentrated phosphoric acid was added to said suspension over a period of 20 minutes at a temperature of 70° C. After the addition of the acid, the slurry was stirred for additional 5 minutes, before removing it from the vessel and drying it using a jet-dryer.

The surface-reacted calcium carbonate thus obtained had a $d_{50}(vol)$ of 6.2 μm, a $d_{98}(vol)$ of 15.1 μm, and specific surface area of 30 $m^2/g$.

Powder 3

Powder 3 was obtained by preparing 350 litres of an aqueous suspension of ground calcium carbonate in a mixing vessel by adjusting the solids content of a ground limestone calcium carbonate from Omya SAS, Orgon, France, having a mass based median particle size of 1.3 μm, as determined by sedimentation, such that a solids content of 10 wt.-%, based on the total weight of the aqueous suspension, was obtained. Whilst mixing the slurry, 37 kg of a 30% concentrated phosphoric acid was added to said suspension over a period of 20 minutes at a temperature of 70° C. After the addition of the acid, the slurry was stirred for additional 5 minutes, before removing it from the vessel and drying it using a jet-dryer.

The surface-reacted calcium carbonate thus obtained had a $d_{50}(vol)$ of 6.6 μm, a $d_{98}(vol)$ of 18.4 μm, and specific surface area of 53.1 $m^2/g$.

Powder 4

Powder 4 was obtained by preparing 2500 litres of an aqueous suspension of ground calcium carbonate in a mixing vessel by adjusting the solids content of a ground limestone calcium carbonate from Omya SAS, Orgon, France, having a mass based median particle size of 0.6 μm, as determined by sedimentation, such that a solids content of 10 wt.-%, based on the total weight of the aqueous suspension, was obtained. Whilst mixing the slurry, 445 kg of a 30% concentrated phosphoric acid was added to said suspension over a period of 45 minutes at a temperature of 70° C. After the addition of the acid, the slurry was stirred for additional 5 minutes, before removing it from the vessel and drying it using a jet-dryer.

The surface-reacted calcium carbonate thus obtained had a $d_{50}(vol)$ of 7.5 μm, a $d_{98}(vol)$ of 19.3 μm, and specific surface area of 83.8 $m^2g^{-1}$.

Powder 5

Powder 5 has been prepared by surface-treating powder 1 with 5 wt.-% of treatment A, based on the total weight of powder 1. To carry out the treatment, the treatment agent (45 g) was first dispersed in 300 mL of deionized water, heated to 60° C. and neutralized to pH 10 with NaOH solution.

A suspension of powder 1 (900 g in 8 L deionized water) was prepared and heated to 80° C. The pH was adjusted to 10 with $Ca(OH)_2$ and the neutralized treatment agent was then added under vigorous stirring. Mixing was continued at 85° C. for 45 minutes, and the suspension was then filtered on a Büchner funnel and dried overnight in an oven (110° C.). The dried filter cake was then deagglomerated using a SR300 rotor beater mill (Retsch GmbH, Germany).

Powder 6

Powder 6 has been prepared by surface-treating powder 1 with 5 wt.-% of treatment B, based on the total weight of powder 1. Treatment was performed in a 10 L batch reactor, under vigorous stirring, by first dispersing 500 g of powder 1 in deionized water (5 L) and heating to 85-90° C. The pH was then adjusted to 10 with $Ca(OH)_2$, and treatment agent B was then added (25 g), and the resulting suspension was stirred at 85° C. for 45 minutes. After that time the filler was filtered on a Büchner funnel and dried overnight in an oven (110° C.). The dried filter cake was then deagglomerated using a SR300 rotor beater mill (Retsch GmbH, Germany).

Powder 7

Powder 7 was obtained by preparing 8 litres of an aqueous suspension of ground calcium carbonate in a mixing vessel by adjusting the solids content of a ground marble calcium carbonate from Omya Spa, Carrara, Italy, having a mass based median particle size of 7.9 μm, as determined by sedimentation, such that a solids content of 20 wt.-%, based on the total weight of the aqueous suspension, was obtained. Whilst mixing the slurry at room temperature, 215 g of an 85% concentrated phosphoric acid was added rapidly to said suspension. After mixing for 30 minutes the resulting product was ground in circulation for 3 h using a Dynomill KDL horizontal mill (Willy A. Bachofen AG, Muttenz, Switzerland) with a 600 ml chamber and 0.6-1.0 mm grinding media.

Powder 7 is a modified calcium carbonate composed of 83 wt.-% calcite and 17 wt.-% hydroxyapatite (specific surface area=67 $m^2$/g, $d_{50}(vol)$=1.2 μm, $d_{98}(vol)$=9.7 μm).

Powder 8

Powder 8 has been prepared by surface-treating an ultra-fine ground calcium carbonate from Norway (specific surface area=13 $m^2$/g, $d_{50}(vol)$=0.3 μm, $d_{98}(vol)$<2 μm). For that purpose, the calcium carbonate powder was treated in a high speed mixer (120° C., 1000 rpm, 15 minutes) with 0.6 wt.-% treatment C, 1 wt.-% treatment A, and 2.5 wt.-% treatment B, based on the total weight of calcium carbonate.

Powder CE1 (Comparative)

Powder CE1 is a N550 carbon black filler, commercially available from Orion engineered Carbons GmbH (Purex® HS 45, iodine number: 43±5 mg/g; STSA surface area (according to ASTM D 6556): 39±5 $m^2$/g).

Powder CE2 (Comparative)

Powder CE2 is a natural barium sulfate, commercially available from Deutsche Baryt-Industrie Dr. Rudolf Alberti GmbH &Co KG ($d_{50}(vol)$=5.2 μm, $d_{98}(vol)$=20 μm).

Powder CE3 (Comparative)

Powder CE3 was obtained from HPF Minerals LTD (Tremin® 283-600, $d_{50}(vol)$: 3.5 μm, $d_{98}(vol)$: 16 μm, specific surface area=4 $m^2$/g).

Further Components

Viton GBL-200S: Copolymer of hexafluoropropylene, vinylidene fluoride, and tetrafluoroethylene with a cure site monomer (Chemours Company).

Elastomag 170: Magnesium oxide (BET: 165 $m^2$/g), vulcanizer, activator, and acid acceptor for halogenated elastomers (Akrochem Corporation).

Rhenofit CF: Calcium hydroxide, cross-linking activator (RheinChemie Additives).

Luperox 101XL: 2,5-Dimethyl 2,5-di(tert-butylperoxy) hexane, organic peroxide (Arkema Inc.).

Diak 7: triallyl isocyanurate, co-agent for peroxide vulcanization (Chemours Company).

3. Examples

Cured fluoropolymer products were prepared as described in the following, wherein the compositions of the prepared cured fluoropolymer products are compiled in Table 5 below.

Step 1: Mixing

Mixing of ingredients was performed in an open mill cylinder mixer (150×350 mm). Composition of the curable fluoropolymer compositions is described in Table 3.

TABLE 3

| Curable fluoropolymer composition. | |
| --- | --- |
| Component | Part by weight |
| Viton GLB200S | 100 |
| Filler (comparative or inventive) | 20 |
| N550 (powder CE1) | 2 |
| Elastomag 170 (MgO) | 3 |
| Rhenofit CF | 6 |
| Luperox 101XL | 3 |
| Diak 7 | 3 |

All the samples produced were mixed with the same times, cylinder speeds, and cylinder spacing as to not influence in the rheological properties comparison. The cooling system was set to 25° C. and the metal guides were set as to allow the curable fluoropolymer composition to occupy 70% of the cylinder surface. In between two accelerations the cylinders were cleaned and let cool. The detail proceedings for this process are described in Table 4 below.

TABLE 4

| External mixing procedure. | | |
| --- | --- | --- |
| (min) | Operation | Cylinder Spacing (mm) |
| t = 0 | Introduction of elastomer | 1 |
| t = 1 | Insertion of fillers | 1 |
| t = 5-8 | Insertion of curing system | 1 |
| t = 5-8 | 5 thin passings | 0.6 |
| | Calendering sheet, thickness 2 mm | 2 |

Step 2: Molding

Cured fluoropolymer products were then produced by compression molding at 160 or 180° C. and 100 kgf/cm pressure. This way, small 150×150×2 mm sheets were prepared. The curing time, which determines the molding time, was determined through a rheological MDR test.

TABLE 5

Composition of cured fluoropolymer products.

| Example | Filler | Description |
|---|---|---|
| CE-1 | Powder CE1 | N550 |
| CE-2 | Powder CE2 | Barium sulfate |
| CE-3 | Powder CE3 | Wollastonite |
| E-1 | Powder 1 | Surface-reacted calcium carbonate |
| E-2 | Powder 2 | Surface-reacted calcium carbonate |
| E-3 | Powder 3 | Surface-reacted calcium carbonate |
| E-4 | Powder 4 | Surface-reacted calcium carbonate |
| E-5 | Powder 5 | Surface-reacted calcium carbonate, treatment A |
| E-6 | Powder 6 | Surface-reacted calcium carbonate, treatment B |
| E-7 | Powder 7 | Surface-reacted calcium carbonate |
| E-8 | Powder 8 | Ultrafine calcium carbonate, treatment A, B, and C |

Figure 2:
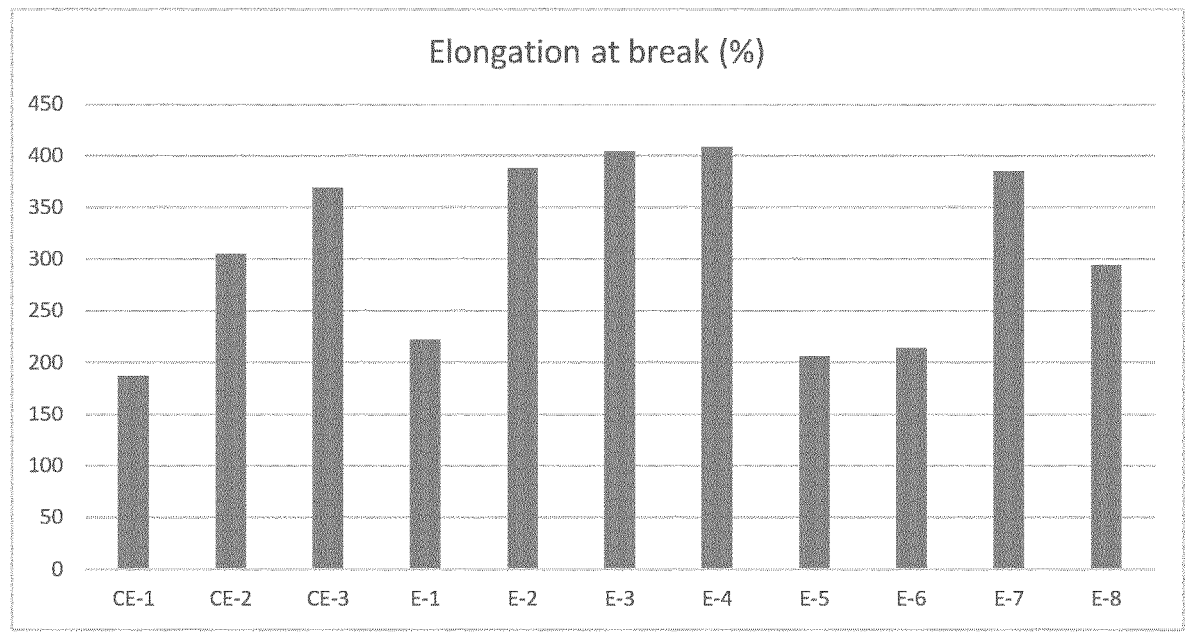

The obtained cured fluoropolymer products were subjected to DELFT tear resistance and elongation at break tests. The results are compiled in Table 6 below and in FIGS. 1 and 2.

TABLE 6

Results of DELFT and elongation at break measurements.

| Example | DELFT 23° C. (MPa) | Elongation at break (%) |
|---|---|---|
| CE-1 | 28.9 | 187 |
| CE-2 | 22.6 | 305 |
| CE-3 | 22.1 | 369 |
| E-1 | 40.6 | 222 |
| E-2 | 24.1 | 388 |
| E-3 | 27.3 | 404 |
| E-4 | 28.5 | 408 |
| E-5 | 40.2 | 206 |
| E-6 | 37.3 | 214 |
| E-7 | 26.1 | 385 |
| E-8 | 31.2 | 294 |

The DELFT tear resistance measurements show that Examples E1, E5, E6 and E8 outperform all comparative Examples CE-1 to CE-3. More importantly, one can note that all but E2, E3 and E7 inventive samples outperform carbon black, which is the only reinforcing filler reference (wollastonite and barium sulfate are usually not considered highly reinforcing fillers).

The tensile tests reveal that all inventive examples outperform the comparative example CE-1 in terms of elongation at break, which is the only reinforcing filler (wollastonite and barium sulfate are not considered reinforcing fillers).

The invention claimed is:

1. A curable fluoropolymer composition comprising
   a crosslinkable fluorine-containing polymer, and
   a filler selected from surface-reacted calcium carbonate and a mixture of surface-reacted calcium carbonate and ultrafine calcium carbonate,
   wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, wherein the natural ground calcium carbonate is selected from the group consisting of marble, chalk, limestone, and mixtures thereof, or
   the precipitated calcium carbonate is selected from the group consisting of precipitated calcium carbonates having an aragonitic, vateritic or calcitic crystal form, and mixtures thereof.

2. The curable fluoropolymer composition of claim 1, wherein the crosslinkable fluorine-containing polymer is a copolymer of vinylidene fluoride and at least one monomer selected from the group comprising hexafluoropropylene, tetrafluoroethylene, fluorinated vinyl ether, perfluoroalkyl-vinylether, chlorotrifluoro-ethylene, propylene, ethylene, bromine- or iodine-containing fluoroolefins, and mixtures thereof.

3. The curable fluoropolymer composition of claim 1, wherein the crosslinkable fluorine-containing polymer has a specific gravity from 0.5 to 5, measured according to ASTM D297, and/or
   the crosslinkable fluorine-containing polymer has a fluorine content from 53 to 71 wt.-%, based on the total weight of the crosslinkable fluorine-containing polymer.

4. The curable fluoropolymer composition of claim 1, wherein the filler is present in an amount from 1 to 80 wt.-%, based on the total weight of the curable fluoropolymer composition.

5. The curable fluoropolymer composition of claim 1, wherein the surface-reacted calcium carbonate has a volume median particle size $d_{50}$ from 0.1 to 75 μm, and/or
   a volume top cut particle size $d_{98}$ from 0.2 to 150 μm, and/or
   a specific surface area of from 15 m²/g to 200 m²/g, measured using nitrogen and the BET method.

6. The curable fluoropolymer composition of claim 1, wherein the ultrafine calcium carbonate has a volume median particle size $d_{50}$ from 0.05 to 1 μm, and/or
   a weight top cut particle size $d_{98}$ from 0.2 to 10 μm, and/or
   a specific surface area of from 1 m²/g to 100 m²/g, measured using nitrogen and the BET method.

7. The curable fluoropolymer composition of claim 1, wherein the at least one $H_3O^+$ ion donor is selected from the group consisting of hydrochloric acid, sulphuric acid, sulphurous acid, phosphoric acid, citric acid, oxalic acid, an acidic salt, acetic acid, formic acid, and mixtures thereof.

8. The curable fluoropolymer composition of claim 1, wherein the ultrafine calcium carbonate is selected from the group consisting of ultrafine ground calcium carbonate, ultrafine precipitated calcium carbonate, ultrafine dolomite, and mixtures thereof.

9. A curable fluoropolymer composition comprising
   a crosslinkable fluorine-containing polymer, and
   a filler selected from surface-reacted calcium carbonate, ultrafine calcium carbonate, or a mixture thereof,
   wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source,
   wherein the filler comprises a surface-treatment layer on at least a part of the filler surface,
   wherein the surface-treatment layer is formed by contacting the filler with at least one surface-treatment agent in an amount from 0.07 to 9 mg/m² of the filler surface, and wherein the at least one surface treatment agent is selected from the group consisting of mono- or di-substituted succinic anhydride containing compounds, mono- or di-substituted succinic acid containing compounds, mono- or di-substituted succinic acid salts containing compounds, saturated or unsaturated fatty acids, salts of saturated or unsaturated fatty acids; unsaturated esters of phosphoric acid, salts of unsaturated phosphoric acid esters, functionalized poly- and/or perfluorinated alkyl compounds, abietic acid, salts of abietic acid, and mixtures thereof and reaction products thereof.

10. The curable fluoropolymer composition of claim 1, wherein the curable fluoropolymer composition comprises a crosslinking agent.

11. The curable fluoropolymer composition of claim 1, wherein the polymer composition further comprises acid acceptor, accelerator, colouring pigment, dyes, wax, lubricant, oxidative- and/or UV-stabilizer, antioxidant, additional filler, processing aid, plasticizer, additional polymer, and mixtures thereof.

12. A cured fluoropolymer product formed from the curable fluoropolymer composition according to claim 1.

13. An article comprising the cured fluoropolymer product according to claim 12, wherein the article is selected from the group comprising o-ring seals, shaft seals, gaskets, tubing, valve stem seals, fuel hose, tank seals, diaphragms, flexi liners for pumps, mechanical seals, pipe coupling, valve lines, military flare blinders, electrical connectors, fuel joints, roll covers, firewall seals, and clips for jet engines.

14. A method of producing a cured fluoropolymer product, comprising the steps of i) providing a crosslinkable fluorine-containing polymer, ii) providing a filler selected from surface-reacted calcium carbonate and a mixture of surface-reacted calcium carbonate and ultrafine calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, wherein the natural ground calcium carbonate is selected from the group consisting of marble, chalk, limestone, and mixtures thereof, or the precipitated calcium carbonate is selected from the group consisting of precipitated calcium carbonates having an aragonitic, vateritic or calcitic crystal form, and mixtures thereof, iii) combining the crosslinkable fluorine-containing polymer of step i) and the filler of step ii) to form a curable fluoropolymer composition, and iv) curing the curable fluoropolymer composition of step iii).

15. The method of claim 14, wherein the curing step iv) is carried out by adding a crosslinking agent, heat treatment, ultraviolet light radiation, electron-beam radiation and/or nuclear radiation.

16. A method comprising providing a filler for reinforcing a cured fluoropolymer product, wherein the filler is selected from surface-reacted calcium carbonate, ultrafine calcium carbonate, or a mixture thereof, and wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

17. The method of claim 16, wherein the tear resistance and/or the elongation at break of the cured fluoropolymer product is increased compared to a cured fluoropolymer product containing an equivalent volume of carbon black N550 as filler.

* * * * *